(12) United States Patent
Mai et al.

(10) Patent No.: US 11,988,939 B2
(45) Date of Patent: May 21, 2024

(54) METHOD FOR PRODUCING AN ELECTRO-OPTICAL PHASE SHIFTER BASED ON FERROELECTRIC MATERIALS

(71) Applicant: IHP GmbH—Innovations for High Performance Microelectronics / Leibniz-Institut fur Innovative Mikroelektronik, Frankfurt (DE)

(72) Inventors: Andreas Mai, Frankfurt (DE); Patrick Steglich, Frankfurt (DE); Christian Mai, Frankfurt (DE)

(73) Assignee: IHP GMBH—INNOVATIONS FOR HIGH PERFORMANCE MICROELECTRONICS / LEIBNIZ-INSTITUT FÜR INNOVATIVE MIKROELEKTRONIK, Frankfurt (DE)

( * ) Notice: Subject to any disclaimer, the term of this patent is extended or adjusted under 35 U.S.C. 154(b) by 35 days.

(21) Appl. No.: 17/590,909

(22) Filed: Feb. 2, 2022

(65) Prior Publication Data

US 2022/0244614 A1    Aug. 4, 2022

(30) Foreign Application Priority Data

Feb. 2, 2021   (EP) ..................... 21154808

(51) Int. Cl.
  *G02F 1/00*   (2006.01)
  *G02F 1/025*  (2006.01)
  (Continued)

(52) U.S. Cl.
  CPC .......... *G02F 1/2257* (2013.01); *G02F 1/0027* (2013.01); *G02F 1/025* (2013.01);
  (Continued)

(58) Field of Classification Search
  CPC ...... G02F 1/2257; G02F 1/0027; G02F 1/025; G02F 2201/122; G02F 1/035; G02B 6/136; G02B 2006/12097
  See application file for complete search history.

(56) References Cited

U.S. PATENT DOCUMENTS 5,270,298 A    12/1993  Ramesh
7,217,584 B2*   5/2007  Yue .................. G02F 1/2257
                                              438/455
(Continued)

FOREIGN PATENT DOCUMENTS

EP       3671186 A1    6/2020
WO    2011/162719 A1   12/2011

OTHER PUBLICATIONS

European Search Report dated Jun. 25, 2021 from EPO in corresponding EP Application No. 21554808.6, 10 pages.
(Continued)

*Primary Examiner* — Ryan A Lepisto
(74) *Attorney, Agent, or Firm* — Ware, Fressola, Maguire & Barber LLP

(57) ABSTRACT

The present invention relates to producing an electro-optical phase shifter such that it may be integrated into a front-end of line of an electronic-photonic integrated circuit. A conducting bottom layer with a first refractive index is provided. A center layer including a ferroelectric material and with a second refractive index is provided on top of a first region of the conducting bottom layer, such that the center layer is not on top of a second region of the conducting bottom layer. A conducting top layer with a third refractive index is provided on top of the center layer. The second refractive index is lower than the first refractive index and lower than the third refractive index, such that the conducting bottom layer, the center layer, and the conducting top layer form a slot waveguide. A first electrical connector which connects (Continued)

the second region of the conducting bottom layer with an upper layer is provided. Additionally, a second electrical connector which connects the conducting top layer with the upper layer is provided. A first electrode and a second electrode are provided in the upper layer such that the first electrode connects to the second region of the conducting bottom layer via the first electrical connector and the second electrode connects to the conducting top layer via the second electrical connector.

17 Claims, 38 Drawing Sheets

(51) Int. Cl.
| | | |
|---|---|---|
| *G02F 1/035* | (2006.01) | |
| *G02F 1/225* | (2006.01) | |
| *G02B 6/12* | (2006.01) | |
| *G02B 6/136* | (2006.01) | |

(52) U.S. Cl.
CPC .... *G02F 1/035* (2013.01); *G02B 2006/12097* (2013.01); *G02B 6/136* (2013.01); *G02F 2201/122* (2013.01)

(56) References Cited

U.S. PATENT DOCUMENTS

| | | | | |
|---|---|---|---|---|
| 9,612,503 | B2* | 4/2017 | Liang | G02F 1/2257 |
| 10,274,757 | B2* | 4/2019 | Fujikata | G02F 1/025 |
| 10,901,246 | B2* | 1/2021 | Han | G02F 1/0516 |
| 10,921,517 | B2* | 2/2021 | Ogawa | G02B 6/12007 |
| 11,630,334 | B2* | 4/2023 | Cheung | G02F 1/3133 |
| | | | | 385/2 |
| 2001/0009472 | A1 | 7/2001 | Wang et al. | |
| 2005/0207704 | A1* | 9/2005 | Keyser | G02F 1/025 |
| | | | | 385/40 |
| 2006/0063679 | A1* | 3/2006 | Yue | G02F 1/025 |
| | | | | 505/190 |
| 2011/0211786 | A1* | 9/2011 | Ushida | G02F 1/025 |
| | | | | 385/2 |
| 2015/0043866 | A1 | 2/2015 | Chen et al. | |
| 2018/0081204 | A1* | 3/2018 | Ma | G02F 1/0027 |
| 2020/0041825 | A1* | 2/2020 | Han | G02F 1/0508 |
| 2022/0197066 | A1* | 6/2022 | Mai | G02F 1/0154 |

OTHER PUBLICATIONS

Office Action, European Application No. 21554808.6, dated Sep. 18, 2023 (7 pages).

* cited by examiner

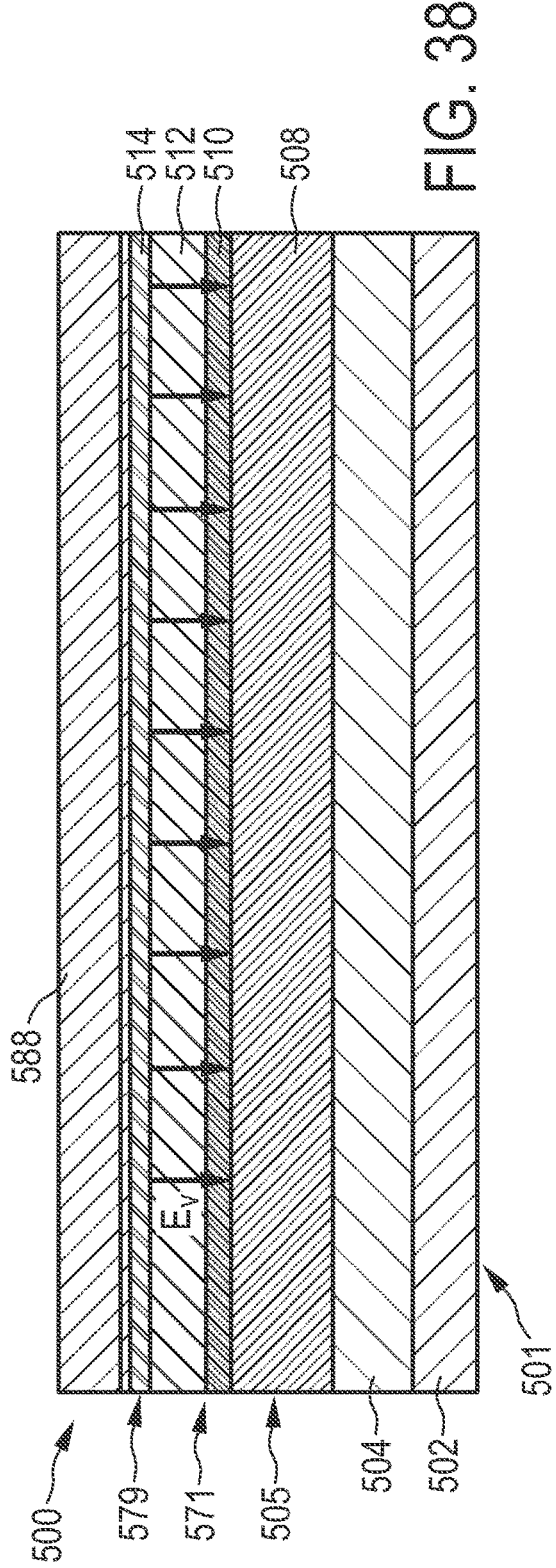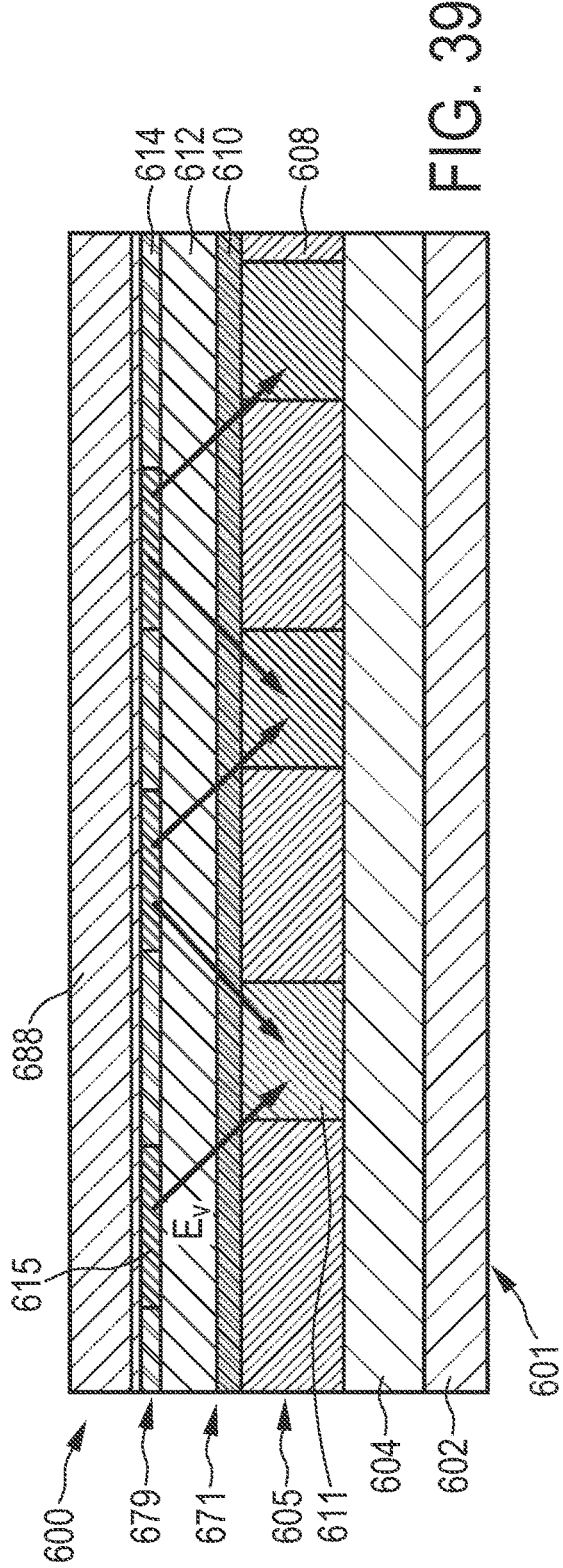

METHOD FOR PRODUCING AN ELECTRO-OPTICAL PHASE SHIFTER BASED ON FERROELECTRIC MATERIALS

TECHNICAL FIELD

The invention relates to a method for producing an electro-optical (EO) phase shifter including a slot waveguide, an EO phase shifter including a slot waveguide, and an electronic-photonic integrated circuit (EPIC) including the EO phase shifter.

BACKGROUND OF THE INVENTION

Slot waveguides have contributed to major advances in EO modulation systems, photonic integrated communication systems, and other chip integrated communication systems. Such systems provide the ability to fabricate photonic devices with well-established semiconductor fabrication methods. However, a major issue of known silicon (Si) EO phase shifters is that Si as a material lacks efficient EO effects due to its crystalline structure, where the linear electro-optical effect (LEOE), also known as Pockels effect, is zero in the dipole approximation. Furthermore, current integration strategies need a wafer bonding process, such that the EO phase shifter is integrated in the back-end of line (BEOL).

SUMMARY OF THE INVENTION

It would thus be desirable to increase the LEOE and to achieve a high, thermal and temporal stable LEOE. Furthermore, it would be desirable to be able to integrate an EO phase shifter into the FEOL of an EPIC.

It can be seen as an object of the present invention to provide a method for producing an EO phase shifter including a slot waveguide, an EO phase shifter, and an electronic-photonic integrated circuit including the EO phase shifter which allow integrating the EO phase shifter into the FEOL of the EPIC while improving efficiency of the EO phase shifter or at least not diminishing it.

In a first aspect a method for producing an EO phase shifter is presented. The method comprises the steps:
  providing a conducting bottom layer with a first refractive index,
  providing a center layer including a ferroelectric material and with a second refractive index on top of a first region of the conducting bottom layer, such that the center layer is not on top of a second region of the conducting bottom layer, and
  providing a conducting top layer with a third refractive index on top of the center layer,
  wherein the second refractive index is lower than the first refractive index and lower than the third refractive index, such that the conducting bottom layer, the center layer, and the conducting top layer form a slot waveguide, and
  providing a first electrical connector which connects the second region of the conducting bottom layer with an upper layer and a second electrical connector which connects the conducting top layer with the upper layer, and
  providing a first electrode and a second electrode in the upper layer such that the first electrode connects to the second region of the conducting bottom layer via the first electrical connector and the second electrode connects to the conducting top layer via the second electrical connector.

Since the conducting bottom layer and the conducting top layer are arranged vertically to each other, applying a voltage to the electrodes allows providing a vertical electrical field extending between the conducting top layer and the first region of the conducting bottom layer. Since a distance between the conducting top layer and the conducting bottom layer between which the vertical electrical field is generated may have a smaller distance than between horizontally arranged electrodes known from the prior art, lower voltages may be applied for generating an electrical field which is strong enough for inducing a LEOE in the ferroelectric material. This allows to improve the LEOE, i.e., Pockels effect, provided by the ferroelectric material sandwiched between the conducting top layer and the conducting bottom layer, e.g., by lowering energy consumption or increasing the LEOE. Hence the ferroelectric material, e.g., barium titanate ($BaTiO_3$), may be used more efficiently as EO material.

Furthermore, the method allows to integrate the EO phase shifter in a front-end of line (FEOL). This may allow to avoid losses in optical coupling compared to an EO phase shifter integrated at a back-end of line (BEOL) as losses in the optical coupling from the FEOL to the EO phase shifter in the BEOL and back to the FEOL may be avoided. The EO phase shifter may be implemented, for example, into a silicon-on-insulator (SOI) substrate, i.e., in the FEOL. For example, the EO phase shifter may be integrated into a SOI technology based on a SiGe-(Bi)CMOS platform. The EO phase shifter may be, for example, integrated in an EPIC technology using the SiGe-(Bi)CMOS platform. This gives perspective to monolithically integrated and highly efficient EO modulators using the Pockels effect in a scalable EPIC technology.

The conducting top layer and the conducting bottom layer may be made, for example, of silicon (Si). The ferroelectric material may be, for example, $BaTiO_3$. For example, for a wavelength of 590 nm, refractive indexes of these materials are 2.43 for $BaTiO_3$, and 3.98 for Si.

The center layer may have a Pockels coefficient equal to or above 1 pm/V, e.g., equal to or above 100 pm/V, above 100 pm/V, equal to or above 400 pm/V, equal to or above 600 pm/V, or equal to or above 923 pm/V. The center layer may, for example, have a Pockels coefficient between 1 pm/V and 2000 pm/V, such as between 400 pm/V and 1000 pm/V, or between 600 pm/V and 923 pm/V. The Pockels coefficient of the center layer may be, for example, 923 pm/V.

The first electrode and the second electrode may be provided such that they are configured for providing a complementary-metal-oxide-semiconductor (CMOS) compatible driver voltage. The electrodes may be provided as locally grown metal regions, e.g., provided by selective epitaxy.

The upper layer is arranged above the conducting bottom layer and above the conducting top layer. The conducting bottom layer may have a thickness, for example, between 80 nm and 300 nm, e.g., 220 nm. The center layer may have a thickness, for example, between 50 nm and 103 nm, e.g., 50 nm or 73 nm. The ferroelectric material may form a ferroelectric material layer with a thickness, for example, between 50 nm and 80 nm, e.g., 50 nm. The conducting top layer may have a thickness, for example, between 50 nm and 250 nm, e.g., 80 nm.

The first electrode and the second electrode may be provided in the upper layer such that they are arranged laterally to each other. This may allow connecting the EO phase shifter through all metal layers, e.g., of the SiGe-(Bi) CMOS platform.

The first electrode and the second electrode may be arranged laterally on opposite sides with respect to the slot waveguide. The upper layer may be, for example, a metal layer.

The center layer may be provided such that it includes a template material arranged between the conducting bottom layer and the ferroelectric material. The template material may be selected such that a lattice mismatch between the conducting bottom layer and the ferroelectric material is mitigated. Providing the center layer such that it includes a template material arranged between the conducting bottom layer and the ferroelectric material allows mitigating a lattice mismatch and a thermal expansion coefficient mismatch between them. This may improve an overlap between optical and electrical field and to provide a highly efficient EO phase shifter. Furthermore, a biaxial tensile in-plane strain may be suppressed between the conducting bottom layer and the ferroelectric layer which may otherwise result in an a-axis growth of the ferroelectric material, e.g., $BaTiO_3$, instead of a c-axis growth. This allows inducing a larger LEOE. Additionally, an interfacial layer may be avoided. Thus, a voltage drop by the interfacial layer may be avoided such that the effective electrical field inside the ferroelectric material may be increased.

The template material may be or may include, for example, $Si_{1-x}Ge_x$ with $0<x\leq1$, strontium titanate ($SrTiO_3$), $SrTiO_3$ on silicon dioxide ($SiO_2$), or Ge on $Si_{1-x}Ge_x$, with $0<x\leq1$. The template material may form a buffer layer with a thickness, for example, between a monolayer and 23 nm, e.g., between 1 nm and 5 nm, such as below 2.5 nm. The refractive index of the template material is, for example, 5.40 for $Si_{1-x}Ge_x$ with x equal to 0.89, 2.28 for $SrTiO_3$, and 5.70 for Ge.

The center layer may be provided, such that it includes or is a vertical material stack. The vertical material stack may include the ferroelectric material and the template material. The vertical material stack is provided such that it has a second refractive index, which is lower than the first refractive index and lower than the third refractive index. The second refractive index corresponds to a refractive index for the vertical material stack which behaves as a single homogeneous layer while being made of multiple heterogeneous layers. In this case, the second refractive index depends on the refractive indices of the constituent layers of the vertical material stack and their thicknesses.

The vertical material stack may be provided, for example, on top of the conducting bottom layer based on one or more of the steps:
 depositing an insulating material, e.g., an oxide, such as $SiO_2$,
 arranging a mask, e.g., a resist mask, above the conducting bottom layer,
 etching a trench into the insulating material for providing a window for the vertical material stack,
 removing the mask, e.g., by ashing,
 depositing the template material, e.g., $Si_{1-x}Ge_x$ with $0<x\leq1$, or $SrTiO_3$ (STO), as a template material layer,
 depositing the ferroelectric material as ferroelectric material layer, e.g., $BaTiO_3$ (BTO) or lithium niobate ($LiNbO_3$),
 depositing an insulating material, e.g., an oxide, such as $SiO_2$,
 depositing a nitride layer, e.g., $Si_3N_4$, CoN, or $Co_3N_2$,
 arranging a mask, e.g., a resist mask, above the vertical material stack,
 structuring the vertical material stack, e.g., above the window for the vertical material stack, or above the rib part of the rib waveguide, respectively, e.g., by removing parts of the vertical material stack above the second region of the conducting bottom layer,
 removing the mask, e.g., by ashing,
 depositing an insulating material, e.g., an oxide, such as $SiO_2$,
 removing the insulating material above the nitride layer, e.g., by chemical mechanical polishing (CMP) selective to nitride,
 removing the nitride layer, e.g., by wet etching, and
 removing the insulating material above the ferroelectric material layer.

Selective epitaxy may be used for providing, e.g., depositing, one or more of the materials and/or layers.

The template material may be arranged between the conducting bottom layer and the ferroelectric material by:
 a cycling annealing approach with a template material thickness smaller than 23 nm, or
 a reverse grating buffer approach with a template material thickness smaller than 23 nm, or
 a cycling annealing approach with a template material thickness larger than 50 nm followed by back etching the template material to a thickness smaller than 23 nm.

The conducting top layer, the conducting bottom layer, or both may be doped or provided as in-situ doped layers. This allows to provide conducting layers that may be contacting and which may generate a vertical electrical field between them when a voltage is applied between them.

At least one of the conducting top layer and the conducting bottom layer may be doped, such that it includes a third region arranged on top or respectively below the center layer. The third region may be doped such that it has a higher doping concentration than another region surrounding the third region, e.g., the first region. This may allow to provide conducting layers that may generate a stronger vertical electrical field between them when a voltage is applied between them. This may allow increasing the LEOE or Pockels effect, respectively. The third doping concentration may be, for example, between $10^{18}$ and $10^{20}$ atoms per cubic centimeter in the conducting top layer and/or in the conducting bottom layer.

The conducting top layer may be provided such that it includes a first region which is arranged on top of the center layer and a second region which is not arranged on top of the center layer.

The conducting top layer may be doped such that the first region of the conducting top layer has a first doping concentration, the second region of the conducting top layer has a second doping concentration, and the second doping concentration is higher than the first doping concentration. Alternatively, or additionally, the conducting bottom layer may be doped such that the first region of the conducting bottom layer has a first doping concentration, the second region of the conducting bottom layer has a second doping concentration, and the second doping concentration is higher than the first doping concentration. Alternatively, or additionally, the conducting top layer and the conducting bottom layer may be doped such that the first regions of the conducting top layer and the conducting bottom layer have first doping concentrations, the second regions of the conducting top layer and the conducting bottom layer have second doping concentrations, and the second doping concentrations are higher than the first doping concentrations.

The first doping concentration of the conducting bottom layer and/or conducting top layer may be, for example, between $10^{13}$ and $10^{18}$ cm$^{-3}$. The second doping concentration of the conducting bottom layer and/or conducting top layer may be, for example, between $10^{18}$ and $10^{20}$ cm$^{-3}$. The conducting bottom layer may be doped by a first type of dopant and the conducting top layer may be doped by a second type of dopant. The conducting bottom layer may be n-doped and the conducting top layer may be p-doped, or vice versa. This allows establishing a vertically electrical field between the conducting bottom layer and the conducting top layer when a voltage is applied between them, e.g., via the first electrode and the second electrode.

A mask, e.g., a resist mask, may be arranged above the oxide layer for doping the first region and the second region of the conducting bottom layer.

Alternatively or additionally, the first regions and second regions of the conducting bottom layer and the conducting top layer may be in-situ doped.

The conducting bottom layer may be structured into a rib waveguide. This allows providing an improved EO phase shifter. Structuring may be performed, for example, based on dry etching and/or wet etching.

The conducting bottom layer may be structured based on one or more of the steps:
  depositing a nitride layer on the conducting bottom layer,
  arranging a mask, e.g., a resist mask, above the conducting bottom layer,
  structuring a part of a waveguide into a rib, e.g., by dry etching, such as reactive ion etching (RIE), two trenches into the conducting bottom layer forming the rib in between them,
  removing the mask from the conducting bottom layer,
  arranging a new mask, e.g., a new resist mask, above the conducting bottom layer,
  further structuring the waveguide, e.g., by dry etching (RIE), further trenches into the conducting bottom layer down to its bottom, such that a separated rib waveguide and optionally a leveling part are provided,
  filling of the trenches with an insulating material, e.g., an oxide,
  removing excess insulating material, e.g., chemical mechanical polishing (CMP) selective to nitride, i.e., down to a nitride layer level,
  removing the nitride and insulating material down to the conducting bottom layer, e.g., by wet etching based on KOH, HF, BF$_6$, or BCl$_3$.

This allows providing a rib waveguide structure of the conducting bottom layer. Additionally a leveling part may be provided which may allow to contact the conducting top layer and the conducting bottom layer via electrical connectors from a same level to an upper layer.

The method may provide the conducting top layer such that the center layer is sandwiched between the first region of the conducting bottom layer, e.g., the rib part of the rib waveguide, and the conducting top layer. This may include one or more of the steps:
  arranging a mask, e.g., resist mask, with trenches for structuring the insulating material, e.g., oxide, such as SiO$_2$, above the leveling part and the second region of the conducting bottom layer,
  removing the insulating material, e.g., oxide, using the trenches in the mask in order to provide trenches in the insulating material above the leveling part and above the second region of the conducting bottom layer, for example, by wet etching,
  removing the mask, e.g., by ashing,
  providing the conducting top layer, e.g., by depositing in-situ doped poly Si or in-situ doped Si$_{1-x}$Ge$_x$, or by depositing a poly Si layer or Si$_{1-x}$Ge$_x$ layer and subsequently performing doping,
  arranging a mask, e.g., a resist mask,
  removing parts of the conducting top layer which are above the second region of the conducting bottom layer, e.g., parts which are not above the leveling part or the rib part of the rib waveguide, for example, by dry etching, such as reactive ion etching (RIE) by endpoint.

The doping of the conducting top layer and the conducting bottom layer is of opposite type, e.g., one with n-type and the other one with p-type dopants, such that a vertical electrical field may be generated between them.

An electrical connection may be provided between the upper layer, i.e., a higher metal layer, and the conducting top layer and the conducting bottom layer based on providing the first electrical connector and the second electrical connector as well as the first electrode and the second electrode in the upper layer such that the first electrode connects to the second region of the conducting bottom layer via the first electrical connector and the second electrode connects to the conducting top layer via the second electrical connector. Providing the electrical connection between the upper layer and the conducting top layer and the conducting bottom layer may include one or more of the steps:
  depositing an insulating material, e.g., an oxide, such as SiO$_2$, on top of the conducting top layer and above the conducting bottom layer,
  arranging a mask, e.g., a resist mask, with two trenches above the trenches in the insulating material above the leveling part and above the second region of the conducting bottom layer,
  removing the insulating material, e.g., the oxide, above the leveling part and above the second region of the conducting bottom layer using the trenches, e.g., by wet etching, for example, by endpoint,
  removing the mask, e.g., by ashing,
  providing contacting layers, e.g., including CoSi or NiSi, on top of or in the conducting top layer above the leveling part and on top of or in the second region of the conducting bottom layer, e.g., silicide may be doped into the conducting top layer above the leveling part and into the second region of the conducting bottom layer,
  depositing an insulating material, e.g., an oxide such as SiO$_2$, and bringing it to an even level, e.g. based on CMP,
  implanting the electrical connectors into the insulating material from the upper layer down to the contacting layers, and
  arranging the electrodes in the upper layer on top of the electrical connectors.

Optionally more than one electrical connector may be provided on top of each other or longer electrical connectors may be used instead if a longer distance between several layers needs to be overcome. The electrical connectors may be made of, e.g., tungsten (W). The electrodes may be metal electrodes, e.g., made of gold (Au). The electrodes may also be made of any other conducting material.

The conducting bottom layer may be provided such that it includes a silicon-on-insulator (SOI) layer. The conducting bottom layer may be made, for example, from crystalline Si (c-Si). This allows integrating the EO phase shifter in a SOI technology, e.g., based on a SiGe-(Bi)CMOS platform.

The method may include the step of providing a carrier layer including, for example, a Si substrate, a buried oxide (BOX) layer, and the SOI layer. The conducting bottom layer may include the SOI layer or additional layers of the carrier layer. An insulating material, e.g. an oxide such as $SiO_2$, may be applied on the carrier layer for insulating it. A mask, e.g., a resist mask, may be arranged above the insulating material for doping the first region and the second region of the conducting bottom layer via a window in the mask, such that the conducting bottom layer becomes a conducting bottom layer which is at least partly doped. Alternatively, the conducting bottom layer may be made of an in-situ doped material.

The top conducting layer may be provided such that it includes or is made of Si. The top conducting layer may be made, for example, from amorphous Si (a-Si).

The ferroelectric material may be provided such that it includes $BaTiO_3$. Including $BaTiO_3$ in the center layer may allow to provide a large LEOE. The ferroelectric material may also be made from or include $LiNbO_3$ or other ferroelectric materials.

At least a region of the conducting top layer which is connected to the second electrode via the second electrical connector, e.g., the second region, may be at a same vertical level as the second region of the conducting bottom layer.

Being at the same vertical level corresponds to a vertical arrangement of at least the region of the conducting top layer which is connected to the second electrode via the second electrical connector within a few nm of vertical distance to the second region of the conducting bottom layer. This allows reducing optical losses by the waveguide as absorption at the waveguide may be reduced. As the second region may have a higher doping concentration, resistance may be reduced. Furthermore, this allows implanting connectors of same length for connecting the conducting layers, i.e., the conducting top layer and the conducting bottom layer, with the electrodes, i.e., the first electrode and the second electrode.

The method may include a step of providing a first silicide layer on top or included in the conducting bottom layer. Alternatively, or additionally, a second silicide layer may be provided on top or included in the conducting top layer. This may allow improving electrical conductivity of the conducting bottom layer and/or the conducting top layer.

In a further aspect an EO phase shifter is presented. The EO phase shifter comprises: a conducting bottom layer, a center layer, a conducting top layer, a first electrode, a second electrode, a first electrical connector, and a second electrical connector. The conducting bottom layer has a first refractive index. The center layer includes a ferroelectric material and has a second refractive index. The center layer is arranged on top of a first region of the conducting bottom layer. The center layer is not arranged on top of a second region of the conducting bottom layer. The conducting top layer has a third refractive index. The conducting top layer is arranged on top of the center layer. The first electrode and the second electrode are arranged in an upper layer. The first electrical connector connects the second region of the conducting bottom layer with the first electrode and the second electrical connector connects the conducting top layer with the second electrode. The second refractive index is lower than the first refractive index and lower than the third refractive index. The conducting bottom layer, the center layer, and the conducting top layer form a slot waveguide.

The upper layer is arranged above the conducting bottom layer and above the conducting top layer.

Since the EO phase shifter includes a conducting bottom layer and a conducting top layer, a vertically arranged electrical field may be generated between them improving the LEOE of the slot waveguide. Due to the configuration of the EO phase shifter, it may be integrated in the FEOL, e.g., of a SiGe-(Bi)CMOS platform, making the EO phase shifter compatible with SiGe-(Bi)CMOS fabrication strategies and techniques. The configuration of the EO phase shifter allows the horizontal slot waveguide to be electrically connected through all metal layers, e.g., of the SiGe-(Bi)CMOS platform. The EO phase shifter may be, for example, a monolithically integrated EO phase shifter, e.g., a monolithically integrated $BaTiO_3$-based EO phase shifter.

The first electrode and the second electrode may be arranged laterally on opposite sides with respect to the slot waveguide.

Various embodiments of the EO phase shifter may be produced as described with respect to embodiments of the method for producing the EO phase shifter.

In a further aspect an EPIC comprising the EO phase shifter according to claim 13 or any embodiment of the EO phase shifter is presented. The EO phase shifter may be integrated in a FEOL of the EPIC. The EPIC may be based on a CMOS platform, e.g., a SiGe-(Bi)CMOS platform.

It shall be understood that the method for producing the EO phase shifter of claim 1, the EO phase shifter of claim 13, and the CMOS platform of claim 14 have similar and/or identical preferred embodiments, in particular, as defined in the dependent claims.

It shall be understood that a preferred embodiment of the present invention can also be any combination of the dependent claims or above embodiments with the respective independent claim.

The present invention will be more fully understood from the following detailed description of embodiments thereof, taken together with the drawings in which:

BRIEF DESCRIPTION OF THE DRAWINGS

FIG. 38 shows a detail of a third embodiment of the EO phase shifter;

FIG. 39 shows a detail of a fourth embodiment of the EO phase shifter.

DETAILED DESCRIPTION

Figure 1:
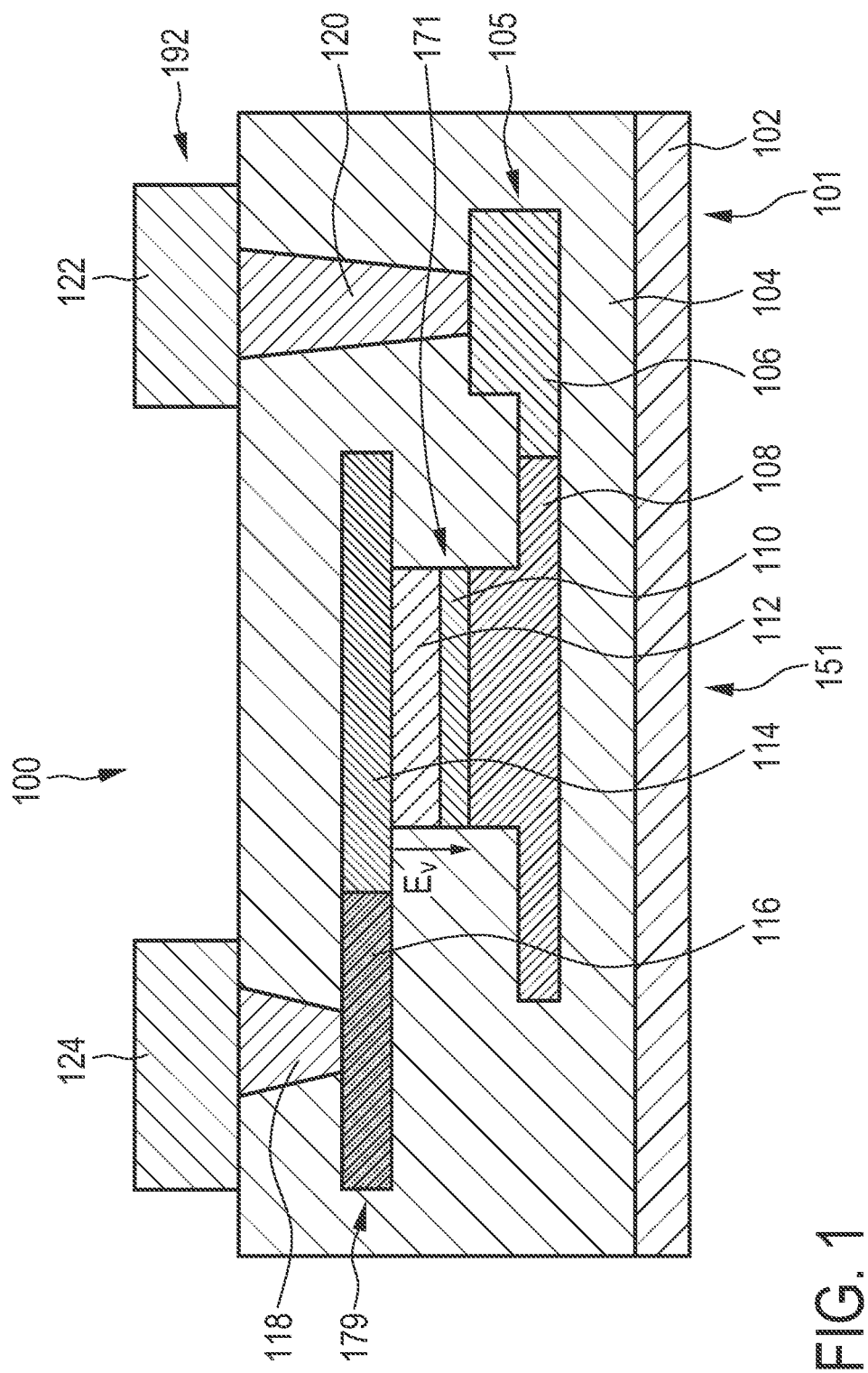
FIG. 1 shows a first embodiment of an EO phase shifter.

FIG. 1 shows a first embodiment of an EO phase shifter 100. The EO phase shifter 100 comprises a carrier layer 101 including an Si substrate 102, a buried oxide (BOX) layer 104, and a SOI layer 105 arranged on the BOX layer 104. The SOI layer 105 is made of crystalline Si, i.e., c-Si.

In this embodiment, the SOI layer 105 includes a first region 108 and a second region 106 which are doped with different doping concentrations. The first region 108 has a first doping concentration between $10^{13}$ and $10^{18}$ atoms per cubic centimeter. The second region 106 has a second doping concentration between $10^{18}$ and $10^{20}$ atoms per cubic centimeter. The SOI layer 105 serves as a conducting bottom layer. In particular, the SOI layer 105 is a doped bottom layer. In this embodiment, the SOI layer 105 has a thickness of 220 nm.

The SOI layer 105 is formed into a rib waveguide with a vertical material stack 171 arranged above a rib part 151 of the rib waveguide, such that the vertical material stack 171 is not above the second region 106 of the SOI layer 105. The vertical material stack 171 forms a center layer of a slot waveguide. The vertical material stack 171 includes a buffer layer 110 made of $Si_{1-x}Ge_x$. In this embodiment, the thickness of the buffer layer 110 is between a monolayer and 23 nm. In other embodiments, other template materials may be utilized for forming the buffer layer, such as $SrTiO_3$. Additionally, the center layer includes a ferroelectric material. In this embodiment, the ferroelectric material is $BaTiO_3$ forming a ferroelectric material layer in form of $BaTiO_3$ layer 112. In this embodiment, the $BaTiO_3$ layer 112 has a thickness of 50 nm, In other embodiments, the ferroelectric material layer may also have a thickness between 50 nm and 80 nm. In other embodiments, another ferroelectric material may be included in the center layer.

A conducting top layer in form of a doped amorphous Si (a-Si) layer 179 is arranged on top of the $BaTiO_3$ layer 112, such that the vertical material stack 171 is sandwiched between the doped a-Si layer 179 and the SOI layer 105 forming a slot waveguide. The conducting top layer is a doped top layer which includes a first region 114, and a second region 116 which are doped with different doping concentrations. The first region 114 has a first doping concentration between $10^{13}$ and $10^{18}$ atoms per cubic centimeter. The second region 116 has a second doping concentration between $10^{18}$ and $10^{20}$ atoms per cubic centimeter. In this embodiment, the doped a-Si layer 179 has a thickness of 80 nm.

The second regions 106 and 116 of the SOI layer 105 and the doped a-Si layer 179, respectively, are connected to electrodes 122 and 124 arranged in an upper layer in form of metal layer 192, respectively via electrical connectors in form of electronic vias 118 and 120 made of tungsten (W). The electrodes 122 and 124 are bulk electrodes made of gold (Au). A CMOS-compatible driver voltage may be applied via the electrodes 122 and 124 to the SOI layer 105 and the doped a-Si layer 179, such that a vertical electrical field Ev may be provided between them that allows EO modulation in the ferroelectric material, i.e., in the $BaTiO_3$ layer 112.

In this embodiment, the SOI layer 105 and the doped a-Si layer 179 have a refractive index of 3.98 for a wavelength of 590 nm. The refractive index of $BaTiO_3$ is 2.43 for a wavelength of 590 nm. Thus, the SOI layer 105 and the doped a-Si layer 179 have a higher refractive index than the ferroelectric material arranged in the slot waveguide region such that a field confinement is achieved within the vertical material stack 171. This allows achieving an improved LEOE.

Figure 2:
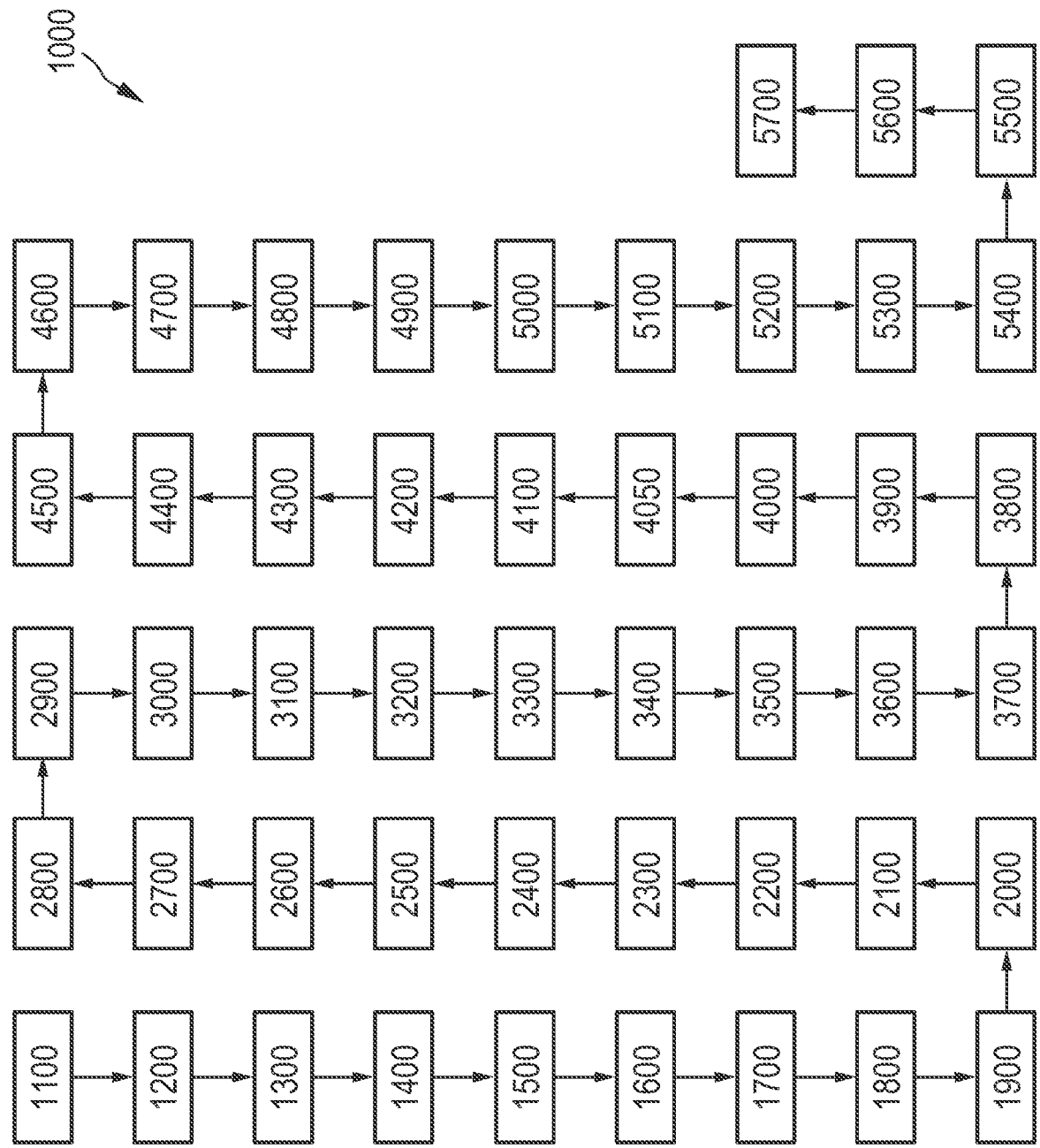
FIG. 2 shows an embodiment of a method for producing a second embodiment of the EO phase shifter.
Figure 34:
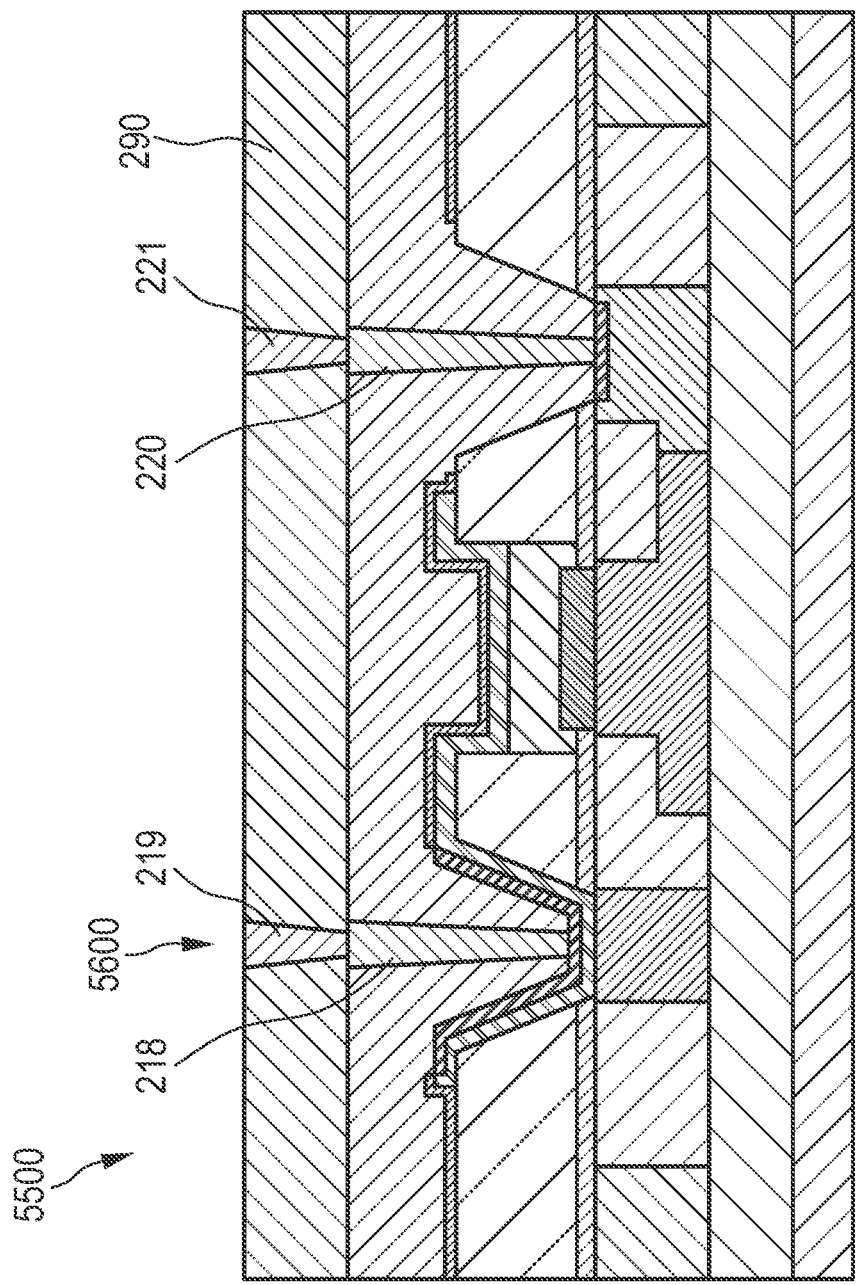
Figure 35:
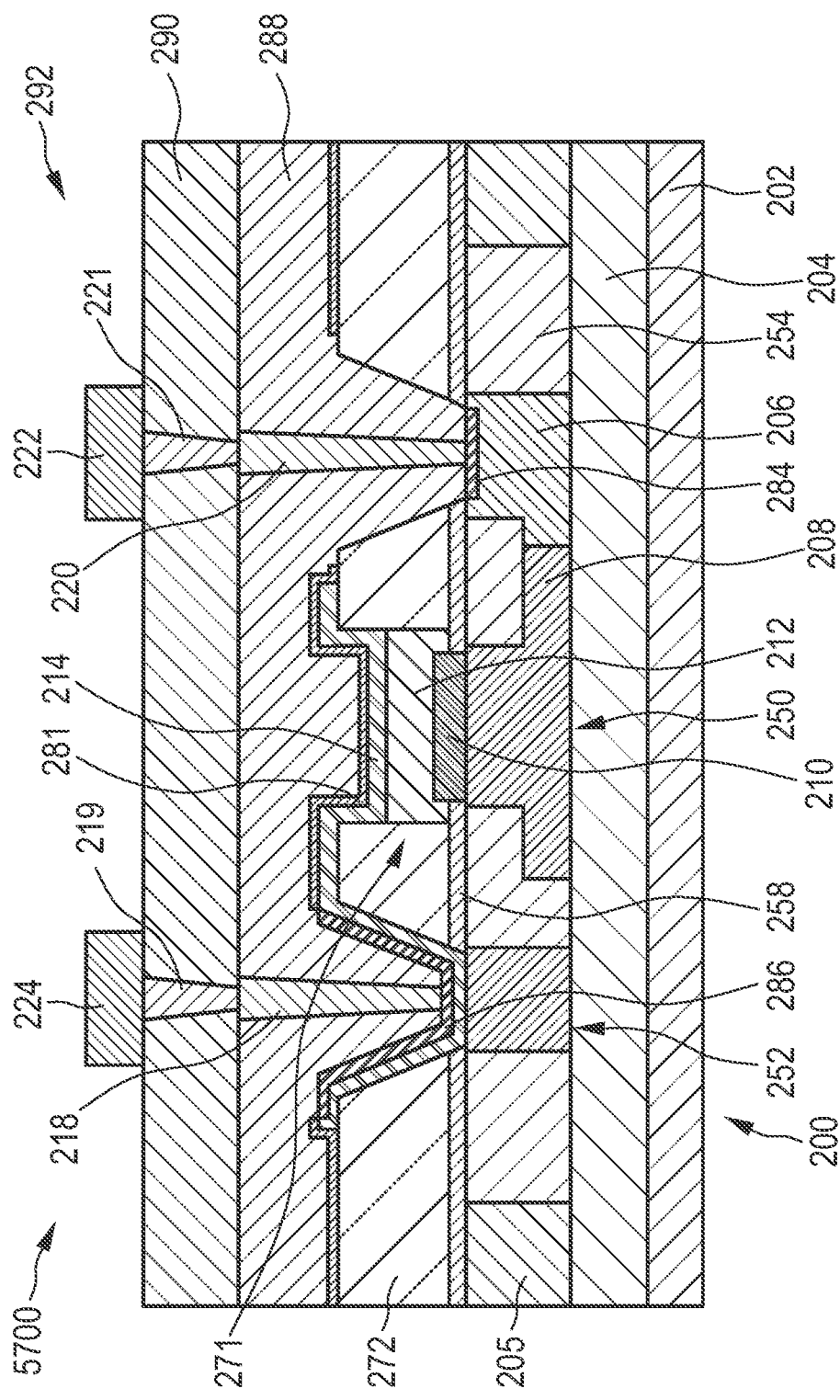
FIG. 35 shows the second embodiment of the EO phase shifter.

FIG. 2 shows an embodiment of a method 1000 for producing a second embodiment of a EO phase shifter 200 as shown in FIG. 35. FIGS. 3 to 35 show the processing steps for producing the second embodiment of the EO phase-shifter 200 according to the method 1000.

Figure 3:
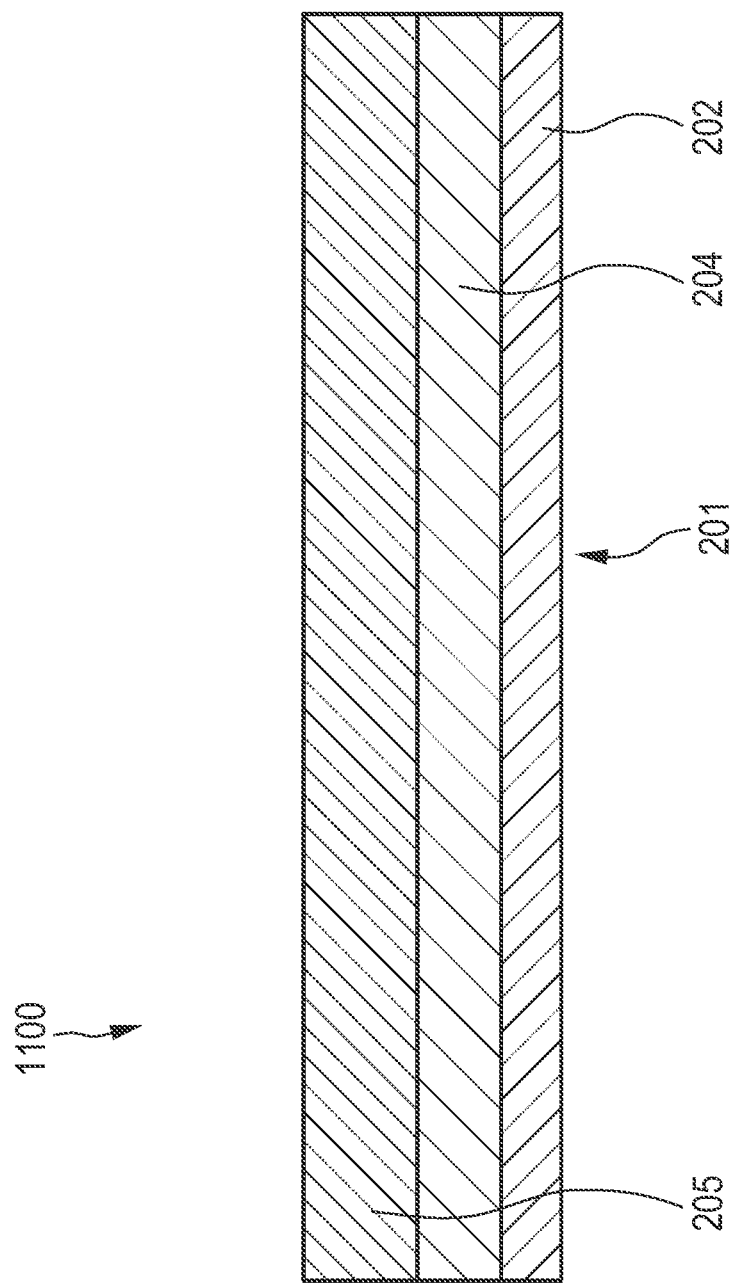
FIGS. 3 to 34 show intermediate processing steps for producing the second embodiment of the EO phase shifter.

FIG. 3 shows step 1100 of the method 1000. In step 1100, a carrier layer is provided. The carrier layer 201 includes a SOI layer 205 arranged on a buried oxide (BOX) layer 204, which itself is arranged on a Si substrate layer 202.

Figure 4:
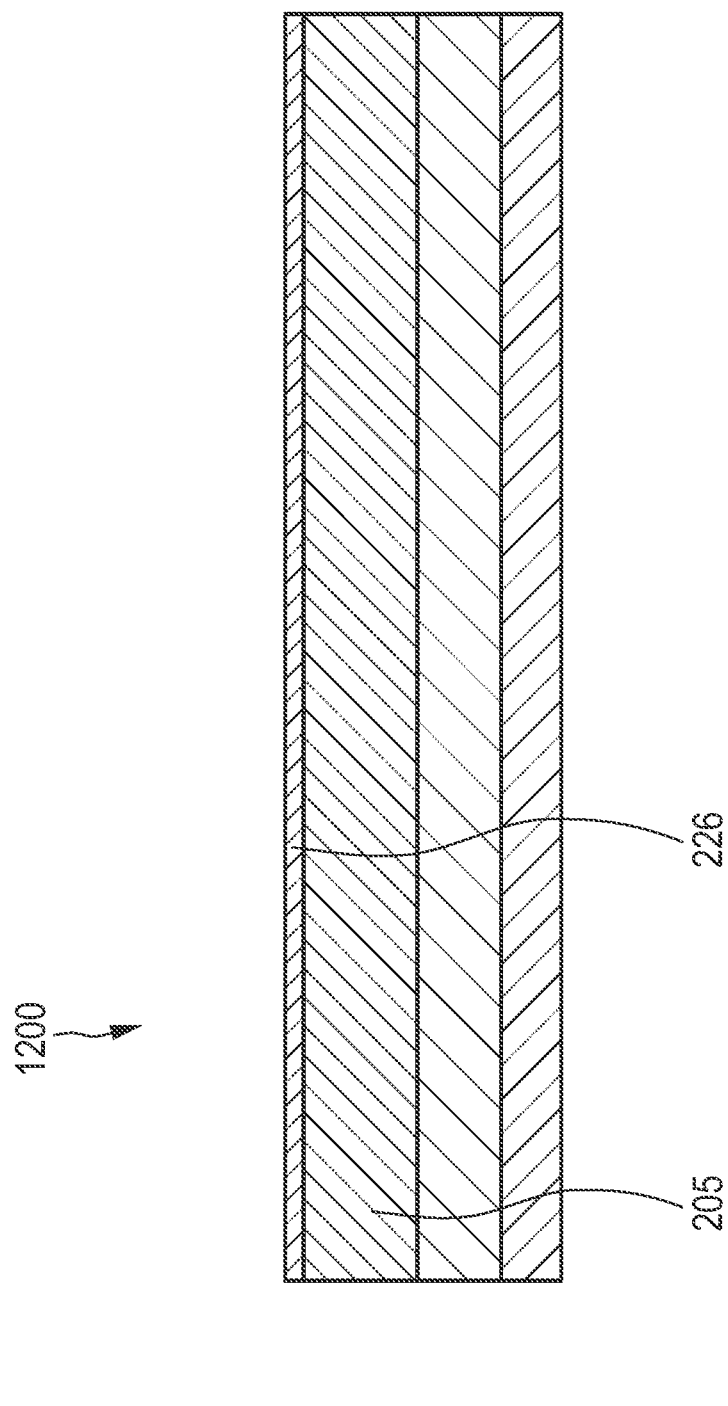

FIG. 4 shows step 1200 of the method 1000. In step 1200, an oxide layer in form of an $SiO_2$ layer 226 is deposited on the SOI layer 205. In this embodiment, the $SiO_2$ layer 226 has a thickness of 10 nm and is made of $SiO_2$. In other embodiments, the oxide layer may also be made of another oxide.

Figure 5:
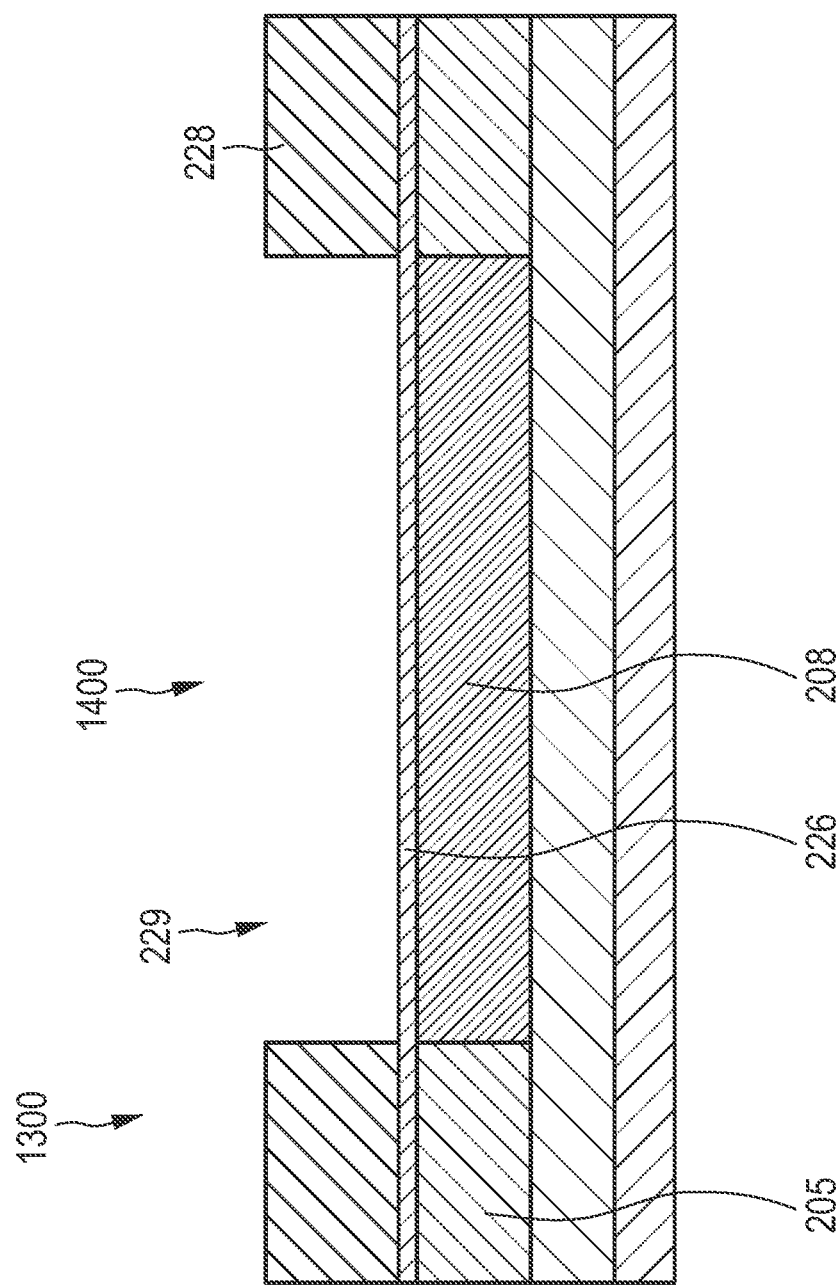

FIG. 5 shows steps 1300 and 1400 of the method 1000.

In step 1300, a resist mask 228 is arranged on the $SiO_2$ layer 226. The resist mask 228 forms a window 229 for doping a first region 208 of the SOI layer 205.

In step 1400, the first region 208 of the SOI layer 205 is doped with a first dopant in order to provide the first region 208 with a first doping concentration. In this embodiment, the first doping concentration is between $10^{13}$ and $10^{18}$ atoms per cubic centimeter.

Figure 6:
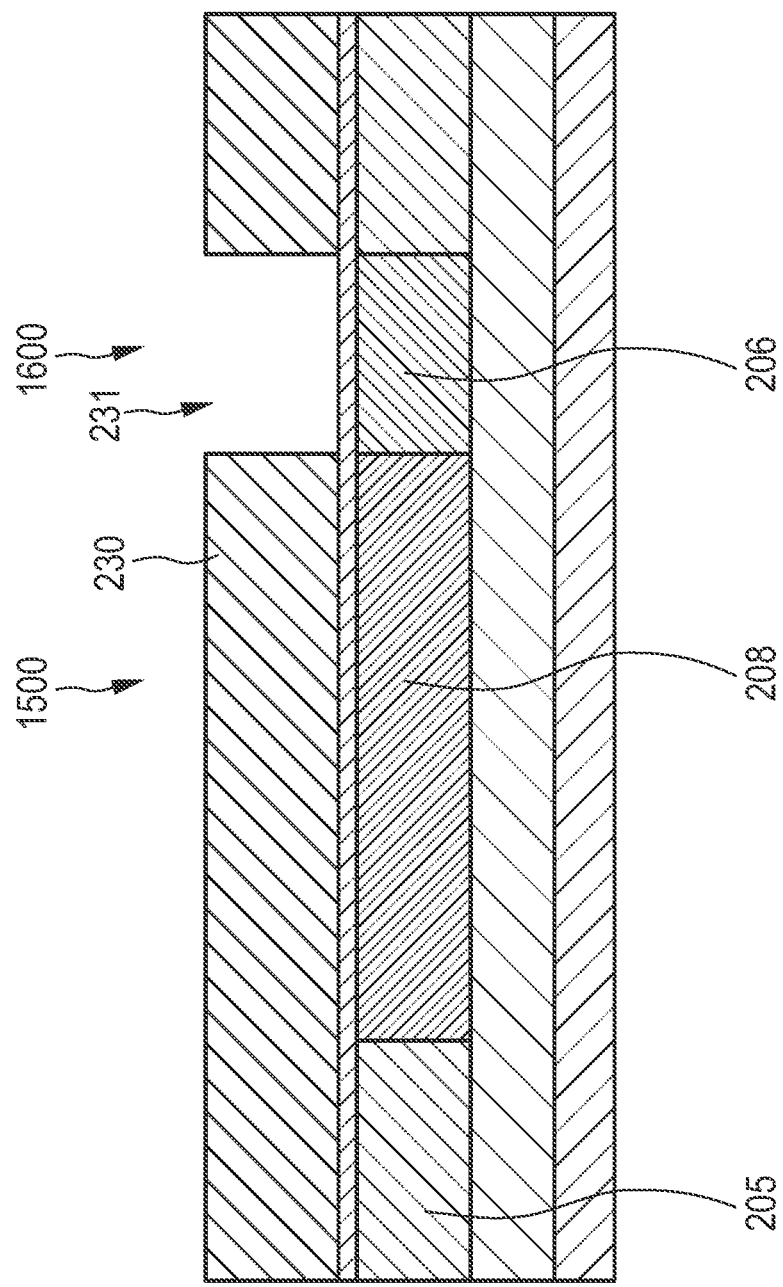

FIG. 6 shows steps 1500 and 1600 of the method 1000.

In step 1500, a further resist mask 230 is arranged on a part of the first region 208 of the SOI layer 205. The resist mask 230 forms a window 231 for further doping the first region 208 of the SOI layer 205 in order to generate a second region 206 of the SOI layer 205 with a higher doping concentration.

In step 1600, the second region 206 of the SOI layer 205 is doped with the first dopant in order to provide the second region 206 with a second doping concentration. In this embodiment, the second doping concentration is between $10^{18}$ and $10^{20}$ atoms per cubic centimeter.

Figure 7:
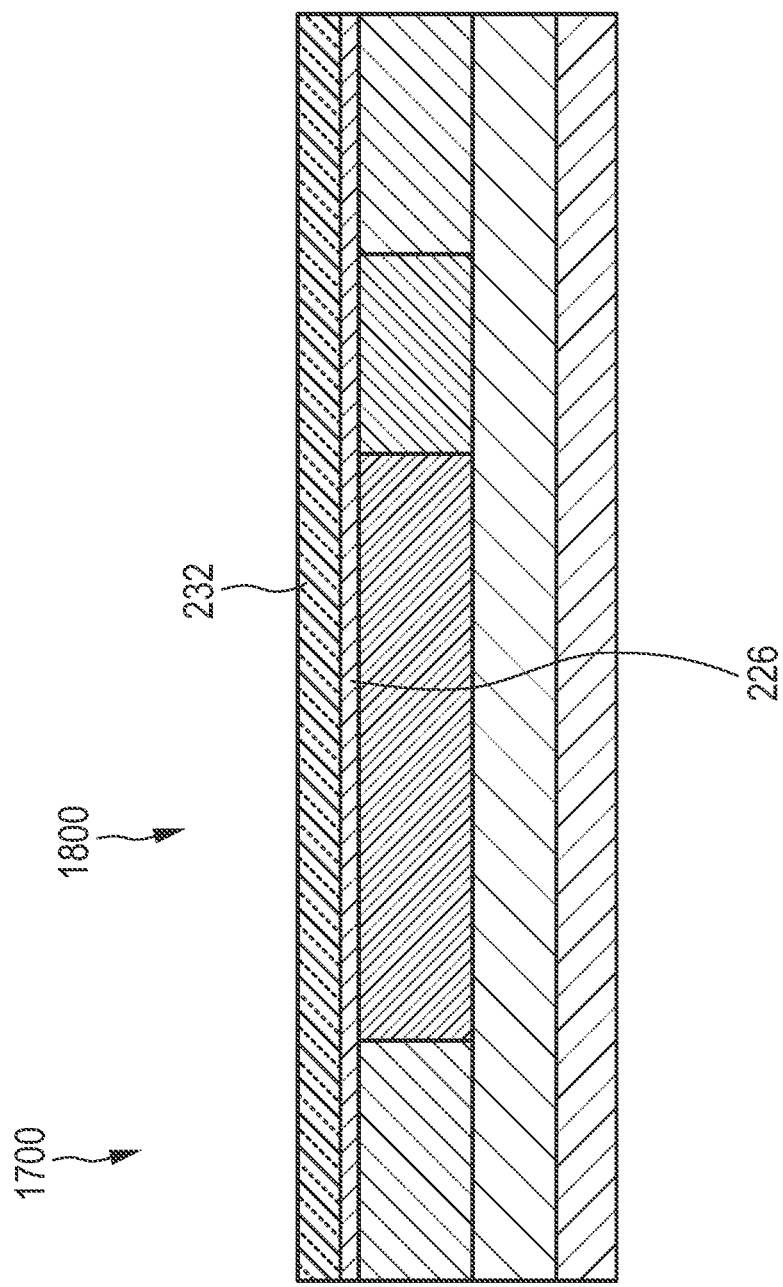

FIG. 7 shows steps 1700 and 1800 of the method 1000.

In step 1700, the resist masks 228 and 230 are removed. In this embodiment, the resist masks 228 and 230 are removed by ashing.

In step 1800, a nitride layer in form of a silicon nitride ($Si_3N_4$) layer 232 is deposited on the $SiO_2$ layer 226. In this embodiment, the $Si_3N_4$ layer 232 has a thickness of 150 nm and is made of $Si_3N_4$. In other embodiments, the nitride layer may be made of another nitride, such as cobalt nitride ($Co_2N$ or $Co_4N_2$) or any other nitride.

Figure 8:
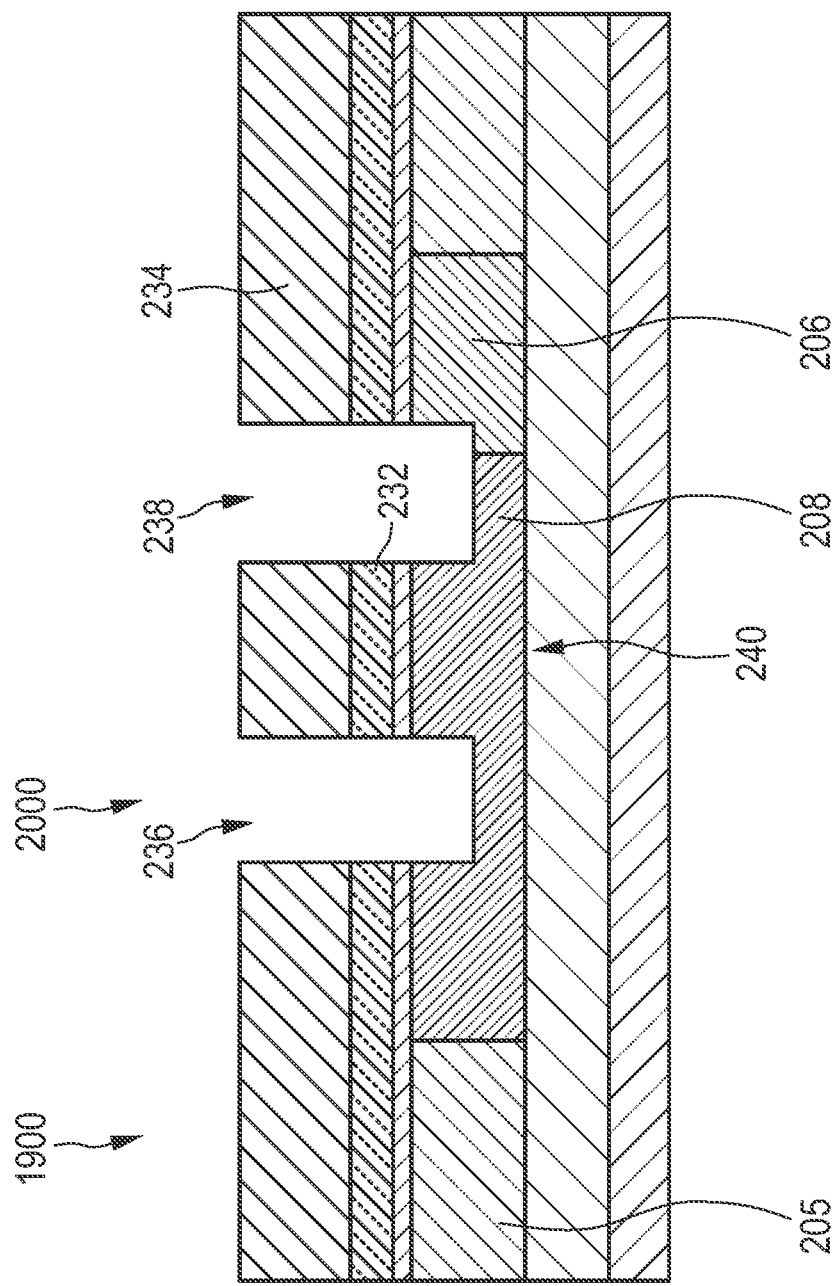

FIG. 8 shows steps 1900 and 2000 of the method 1000.

In step 1900, a further resist mask 234 is arranged on the $Si_3N_4$ layer 232.

In step 2000, a first trench 236 is etched into the first region 208 of the SOI layer 205 and a second trench 238 is etched into a region covering partly the first region 208 and partly the second region 206 of the SOI layer 205 in order to form a waveguide structure part 240 in form of a rib waveguide. In this embodiment, etching is performed by reactive-ion etching (RIE). In other embodiments, other dry-etching methods may be used.

Figure 9:
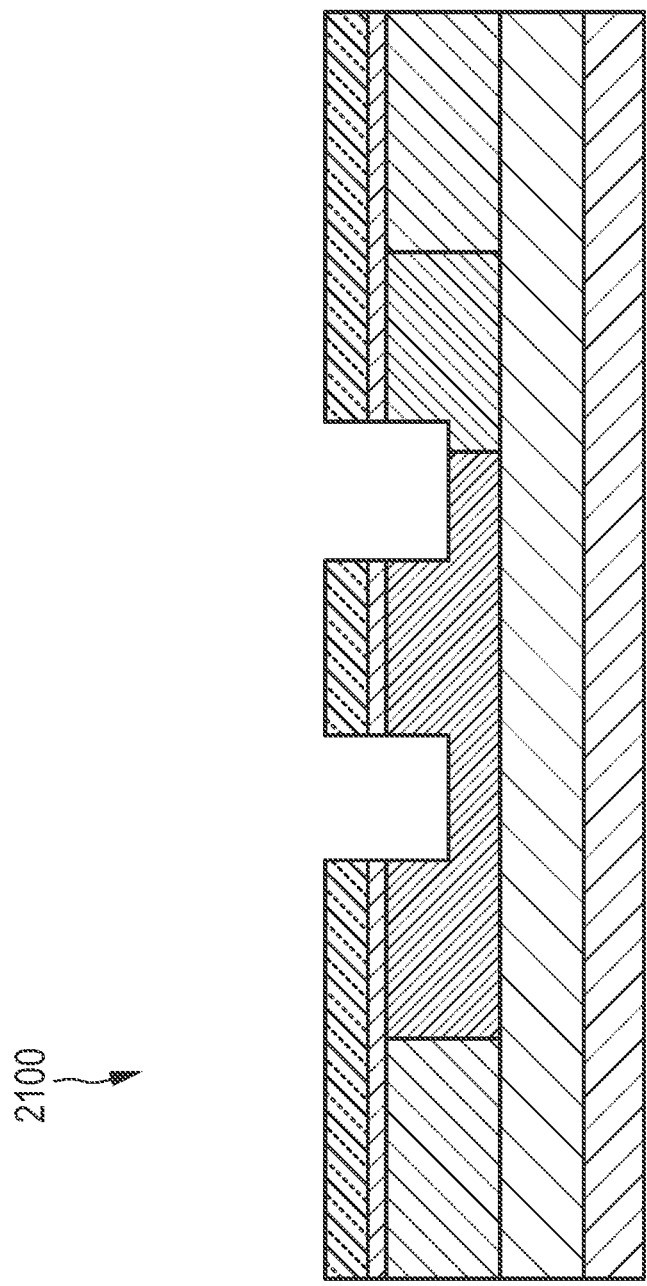

FIG. 9 shows step 2100 of the method 1000. In step 2100, the resist mask 234 is removed by ashing.

Figure 10:
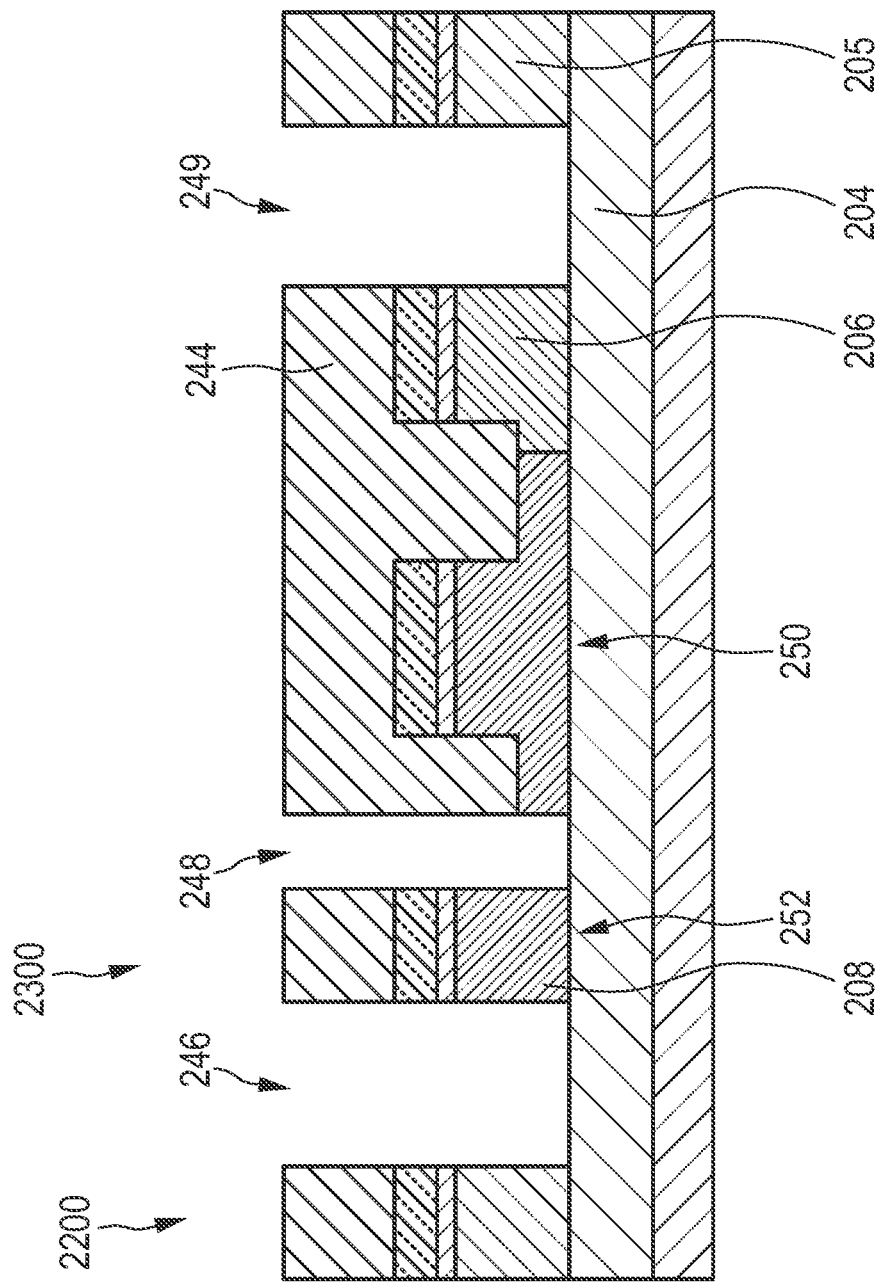

FIG. 10 shows steps 2200 and 2300 of the method 1000.

In step 2200, a further resist mask 244 is arranged on the structure.

In step 2300, further etching is performed in order to produce trenches 246, 248, and 249 for defining the waveguide structure. Etching is performed down to the BOX layer 204. Etching around a part of the first region 208 allows to produce a leveling part 252 of the first region 208 of the SOI layer 205 which is not connected to rib waveguide 250. Furthermore, etching is performed such that the second region 206 of the SOI layer 205 is separated from undoped parts of the SOI layer 205. In this embodiment RIE is used for etching. In other embodiments, other dry etching techniques may be used.

Figure 11:
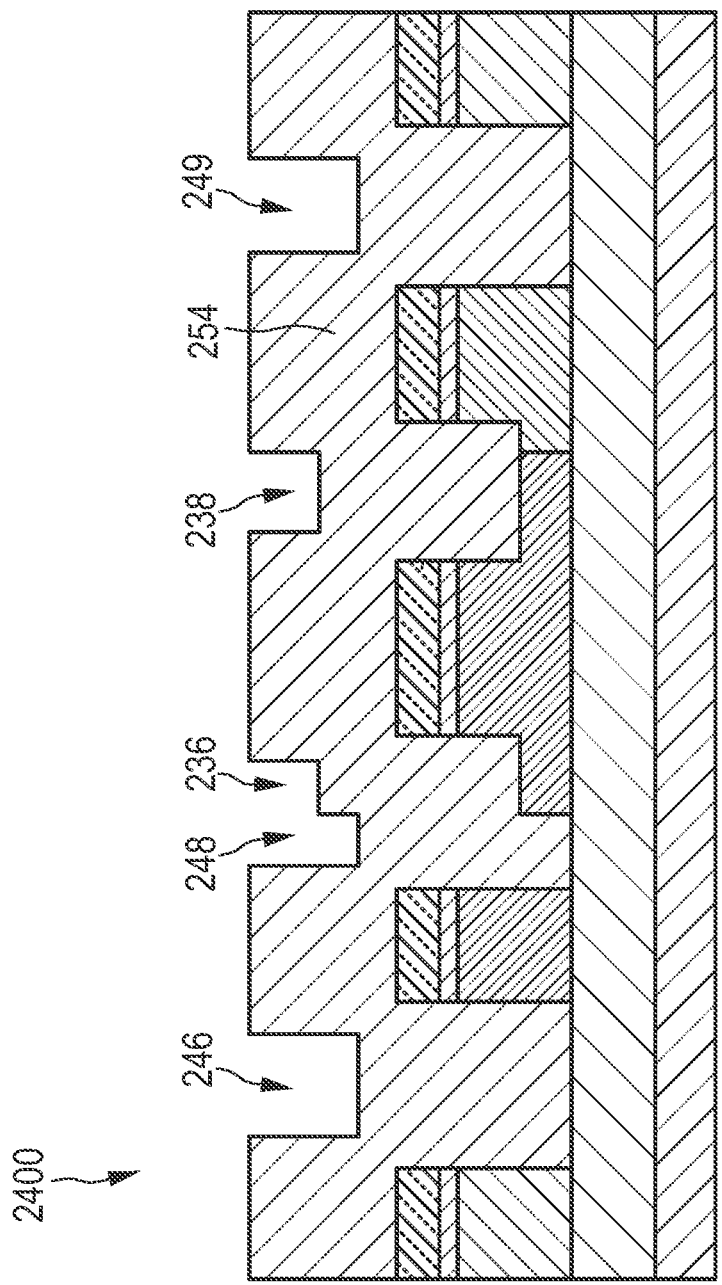

FIG. 11 shows step 2400 of the method 1000. In step 2400, oxide in form of $SiO_2$ 254 is deposited on the structure in order to fill the trenches 236, 238, 246, 248, and 249. In this embodiment, the oxide is $SiO_2$. In other embodiments, another oxide may be deposited.

Figure 12:
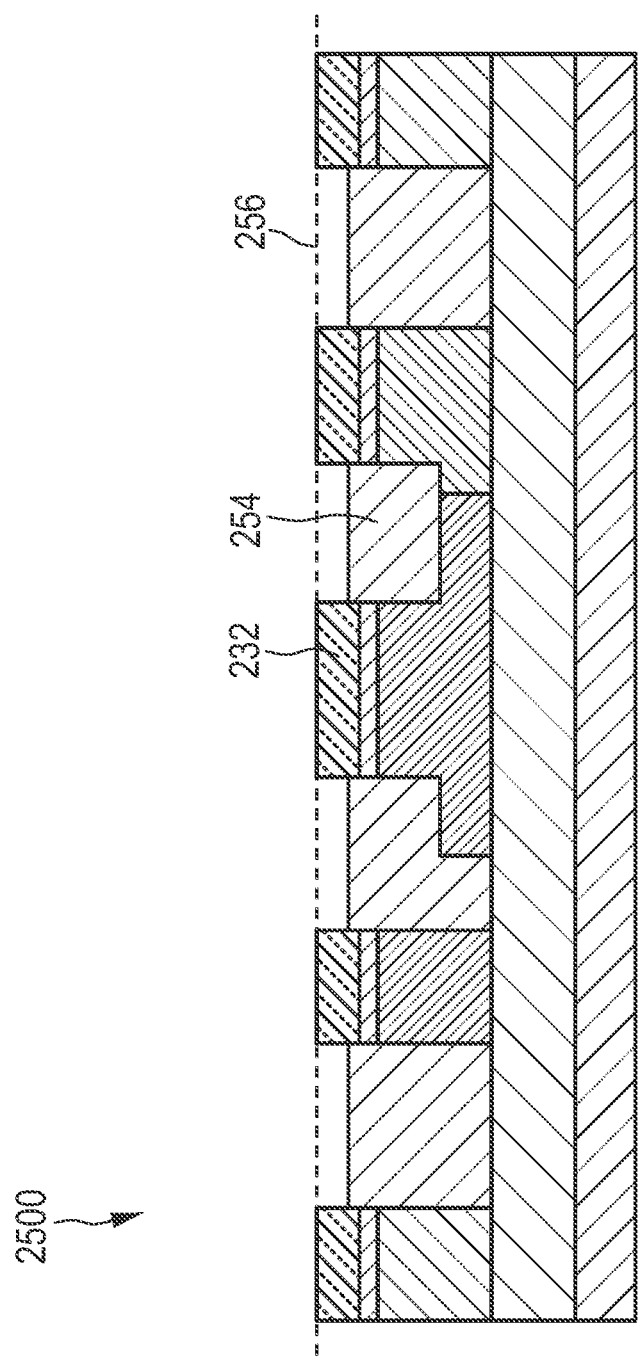

FIG. 12 shows step 2500 of the method 1000. In step 2500, the $SiO_2$ 254 is partly removed to a level 256 of or slightly below an upper end of the $Si_3N_4$ layer 232. In this embodiment, chemical-mechanical polishing (CMP) selective to the $Si_3N_4$ is used for removing the $SiO_2$ 254, i.e., only $SiO_2$ 254 is removed while $Si_3N_4$ is not removed.

Figure 13:
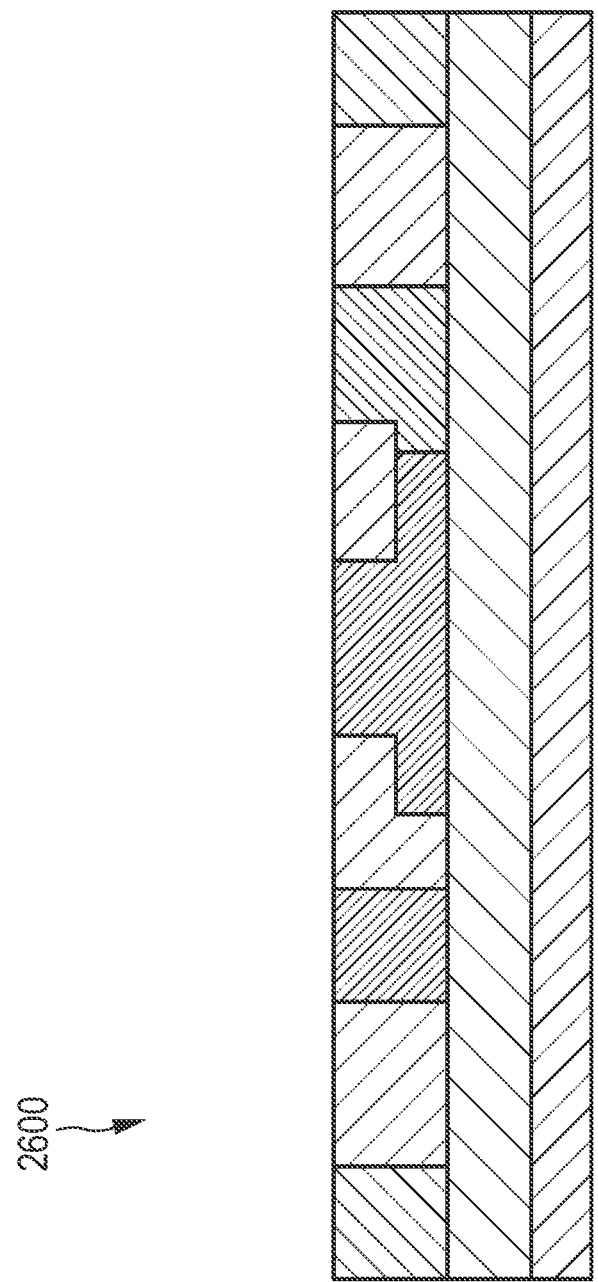

FIG. 13 shows step 2600 of the method 1000. In step 2600, the $Si_3N_4$ layer 232 and $SiO_2$ layer 226 above the SOI layer 205 are removed. In this embodiment, the layers 226 and 232 are etched down to the SOI layer 205, in particular by wet etching. Wet etching may be performed using, for example, potassium hydroxide (KOH), hydrofluoric acid (HF), bor fluoride ($BF_6$), or bor chloride ($BCl_3$). Preferably, KOH or HF are used for wet etching.

Figure 14:
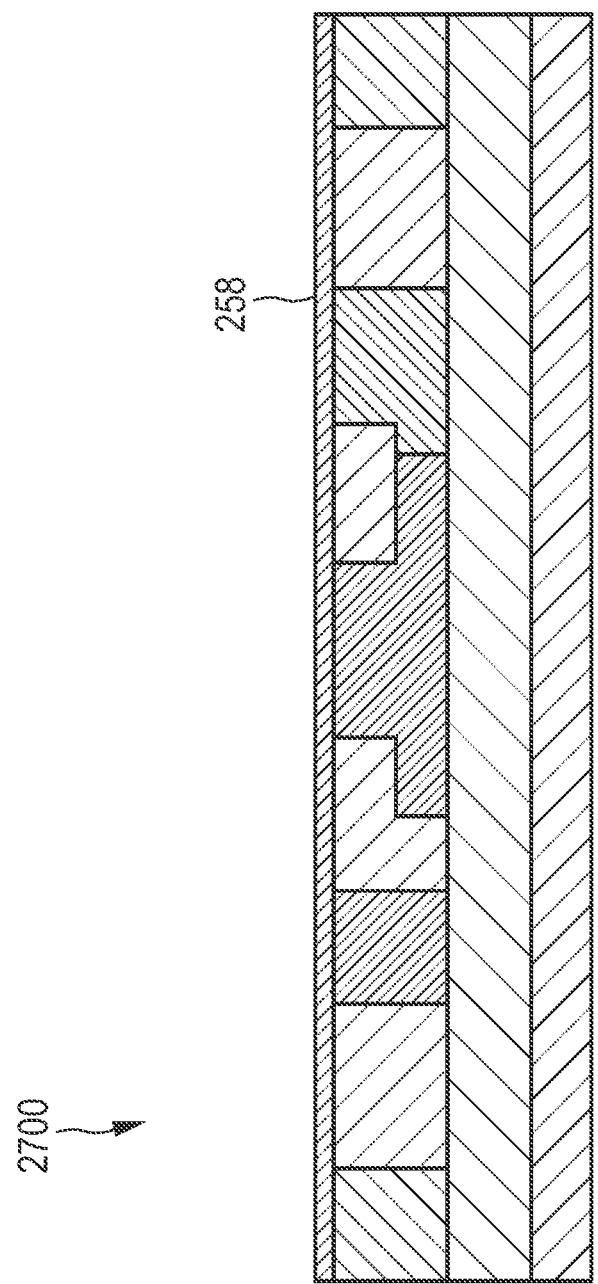

FIG. 14 shows step 2700 of the method 1000. In step 2700, an oxide layer in form of an $SiO_2$ layer 258 is deposited on the structure. In this embodiment, the oxide layer is made of $SiO_2$. In other embodiments, the oxide layer may be made of any other oxide.

Figure 15:
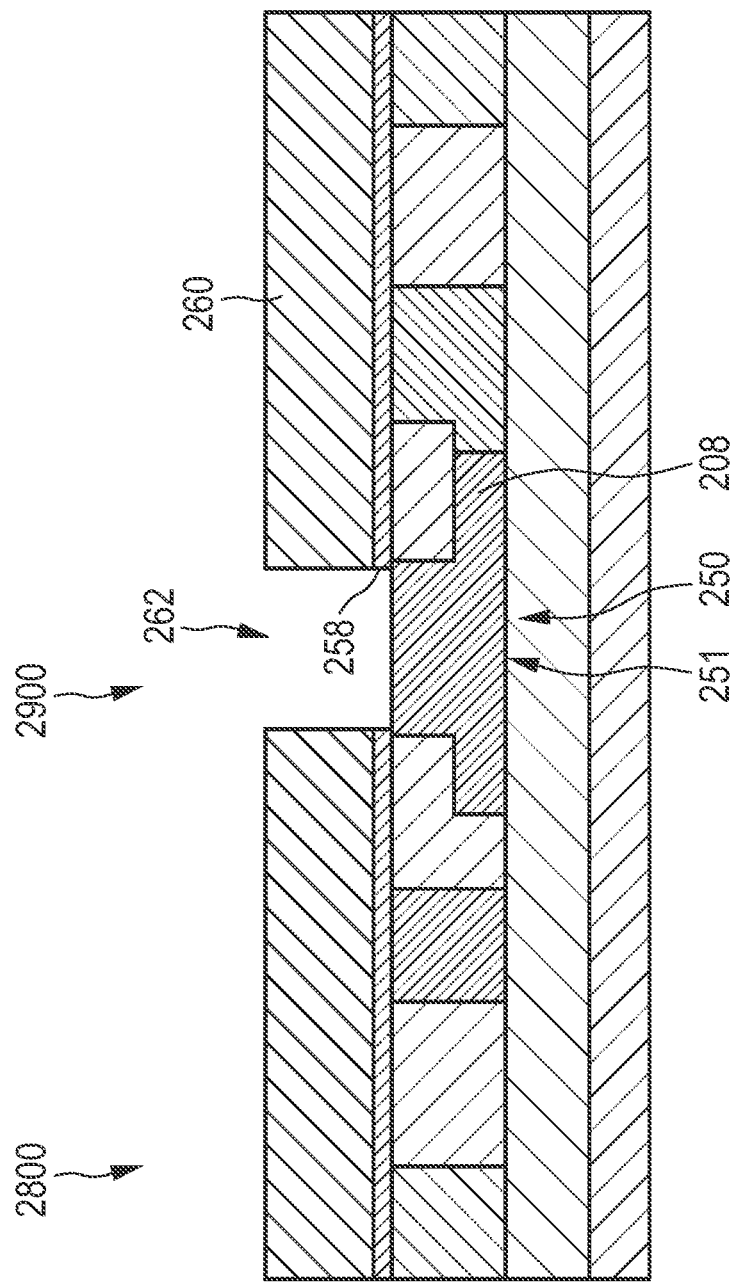

FIG. 15 shows steps 2800 and 2900 of the method 1000.

In step 2800, a further resist mask 260 is arranged on the $SiO_2$ layer 258.

In step 2900, a trench 262 is etched down to the first region 208 of a rib part 251 of the rib waveguide 250. In this embodiment, wet etching is used for etching the trench 262.

Figure 16:
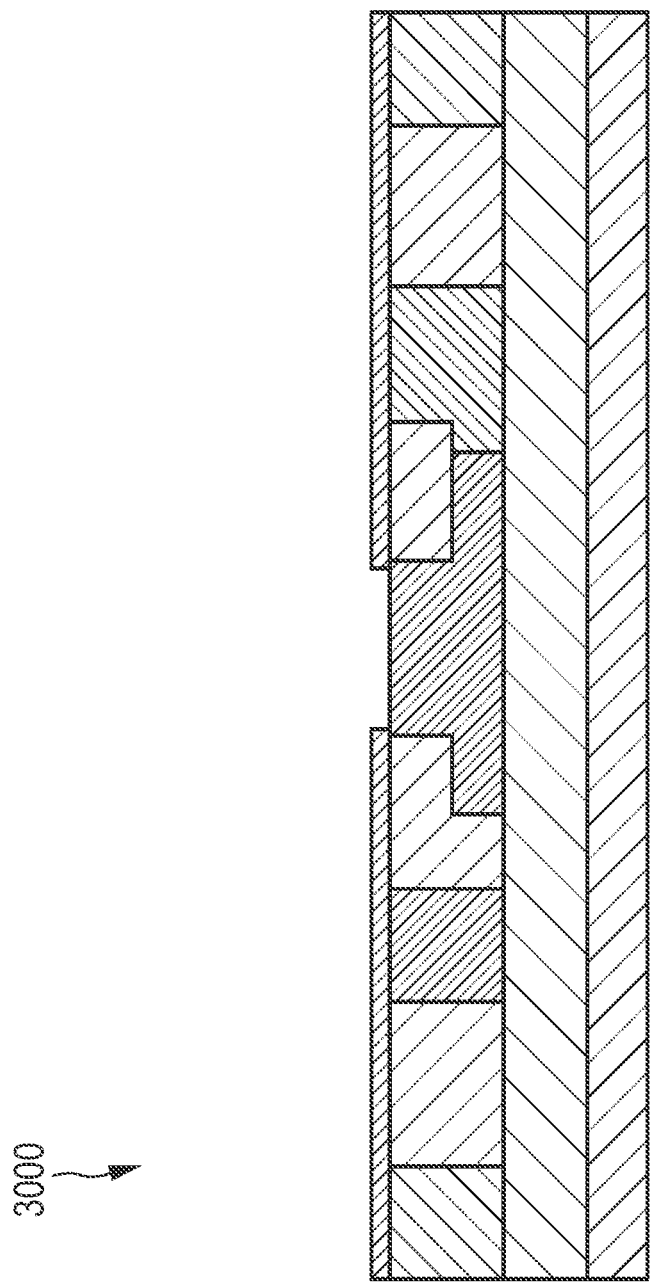

FIG. 16 shows step 3000 of the method 1000. In step 3000, the resist mask 260 is removed. In this embodiment, ashing is performed for removing the resist mask 260.

Figure 17:
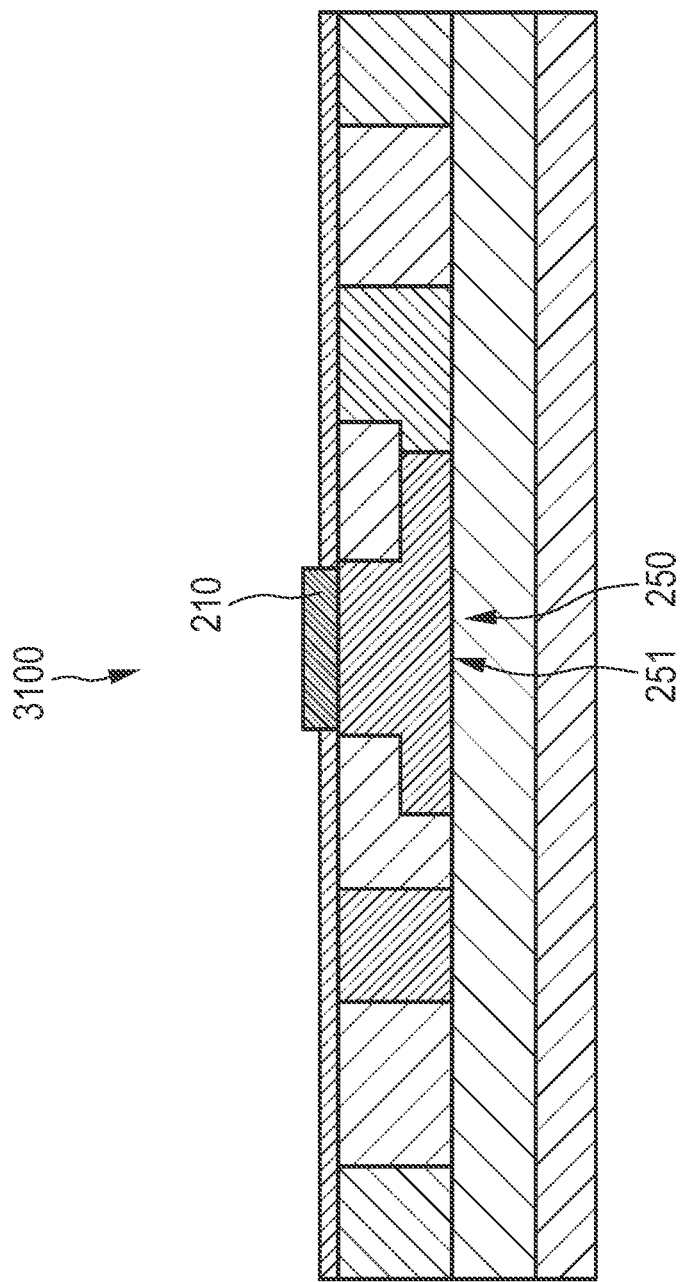

FIG. 17 shows step 3100 of the method 1000. In step 3100, an $Si_{1-x}Ge_x$ region 210 is grown on the rib part 251 of the rib waveguide 250 by selective epitaxy. In other embodiment, other methods for growing the $Si_{1-x}Ge_x$ region may be used, e.g., one of the methods presented in FIG. 37A, FIG. 37B, or FIG. 37C. In yet other embodiments, a template layer made from another material, e.g., STO, may be grown on the rib part in order to reduce a lattice mismatch between the rib waveguide and a ferroelectric material layer to be deposited onto the template layer.

Figure 18:
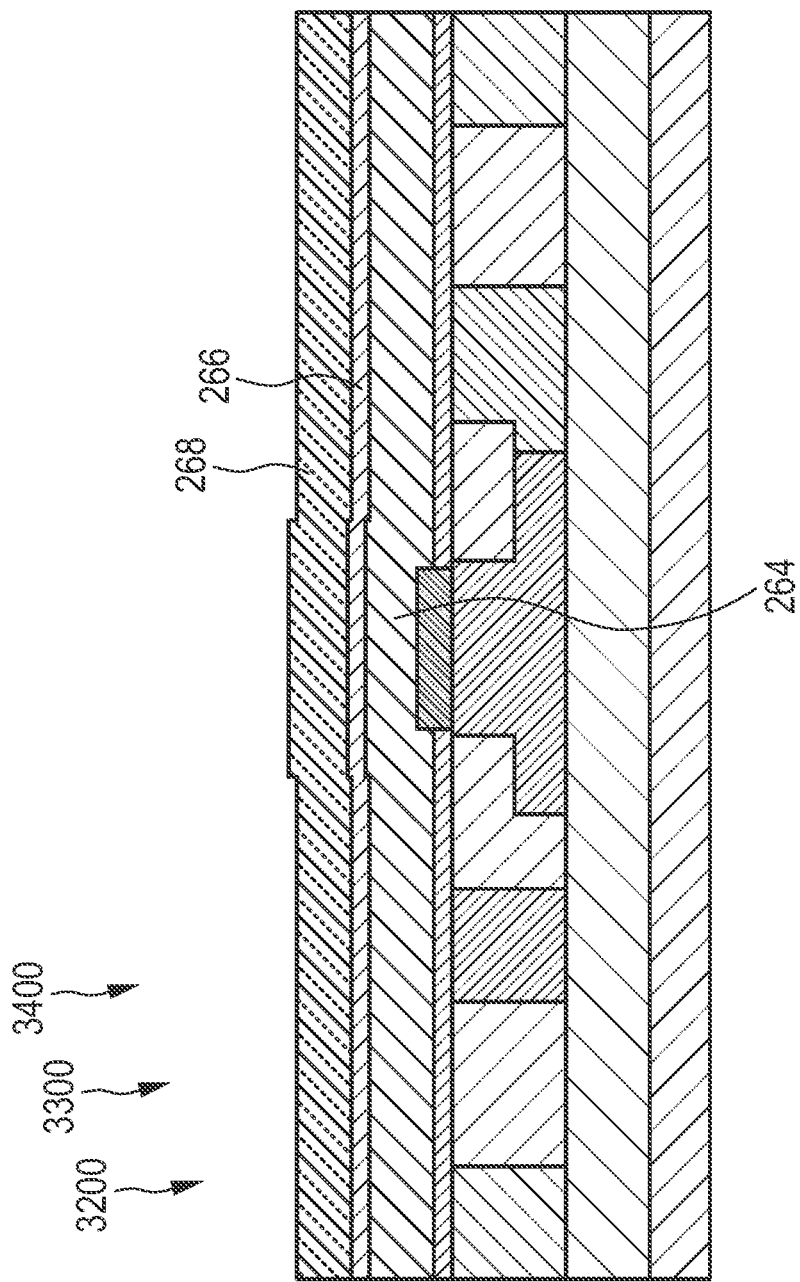

FIG. 18 shows steps 3200, 3300, and 3400 of the method 1000.

In step 3200, a ferroelectric material layer in form of a $BaTiO_3$ layer 264 is deposited on the structure. In this embodiment, the ferroelectric material layer is made of $BaTiO_3$. In other embodiments, the ferroelectric material layer may also be made of another ferroelectric material, such as $LiNbO_3$.

In step 3300, an oxide layer in form of $SiO_2$ layer 266 is deposited on the $BaTiO_3$ layer 264. In this embodiment, the oxide layer is made of $SiO_2$. In other embodiments, the oxide layer may be made of another oxide.

In step 3400, a nitride layer in form of $Si_3N_4$ layer 268 is deposited on the $SiO_2$ layer 266. In this embodiment, the nitride layer is made of $Si_3N_4$. In other embodiments, the nitride layer may be made of another nitride, such as cobalt nitride (CoN or $Co_3N_2$).

Figure 19:
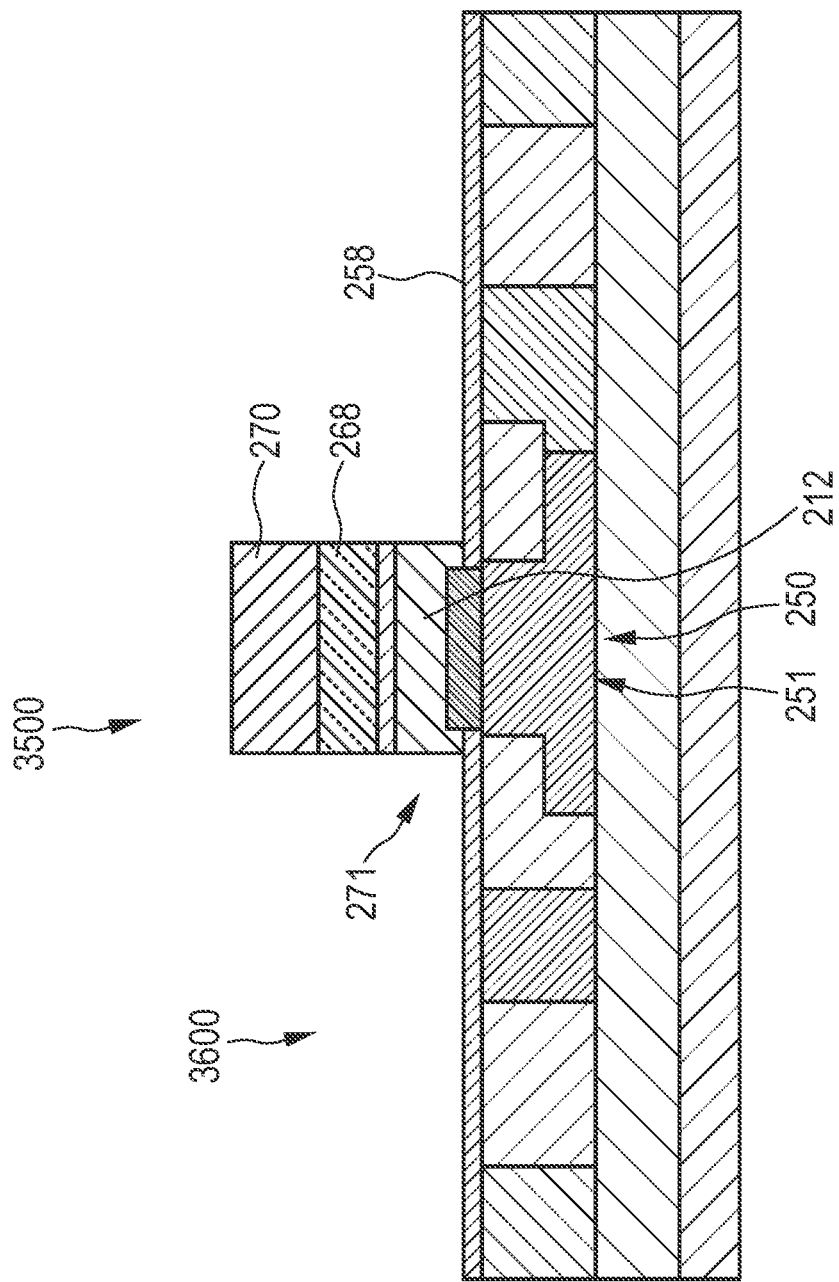

FIG. 19 shows steps 3500 and 3600 of the method 1000.

In step 3500, a resist mask 270 is deposited on the $Si_3N_4$ layer 268.

In step 3600, etching is performed down to the $SiO_2$ layer 258 by endpoint around the rib part 251 of the waveguide 250 for producing a vertical material stack 271 above the rib part 251 of the waveguide 250 including the $BaTiO_3$ layer 212. In this embodiment RIE is used for etching. In other embodiments, other dry etching techniques may be used for etching. Etching is performed until an endpoint is detected. The endpoint may be detected, for example, based on a change of etching parameters, e.g., a change in partial pressure of reactants.

Figure 20:
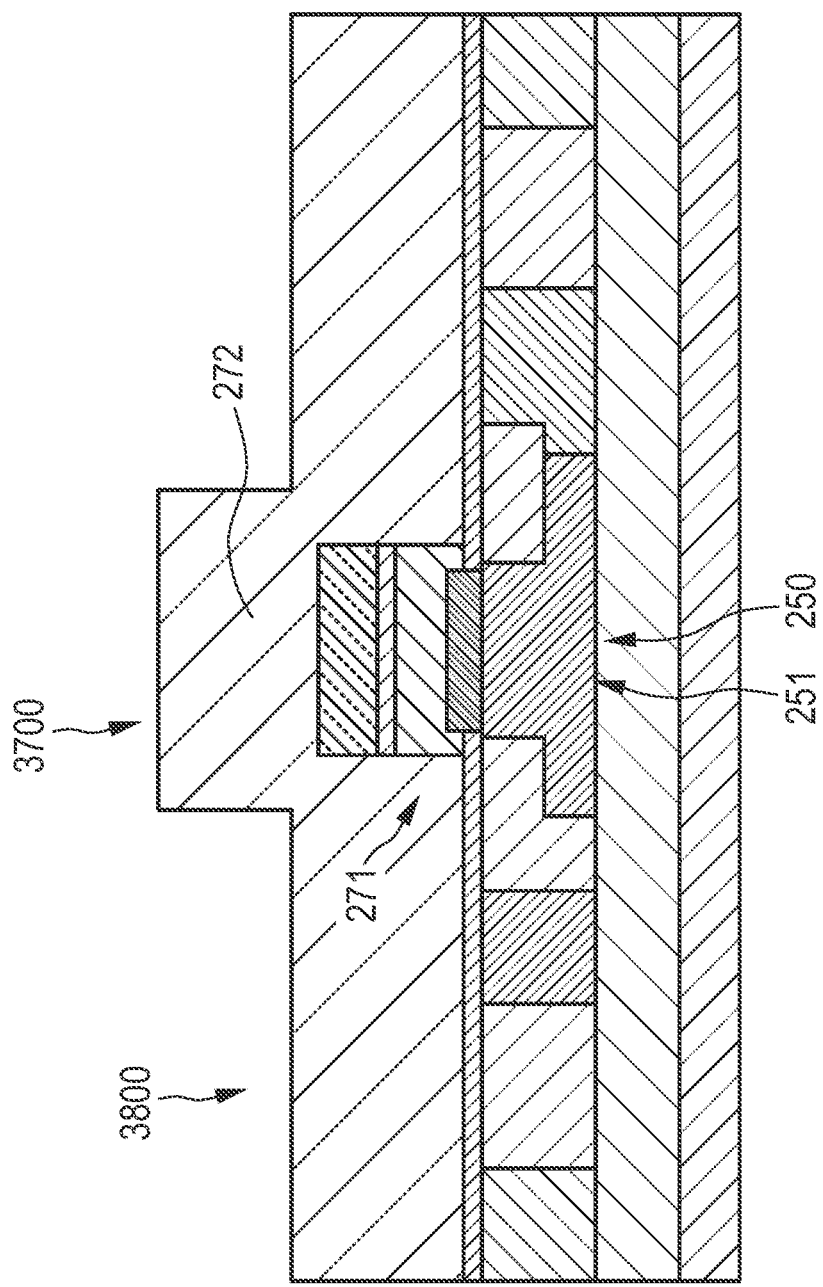

FIG. 20 shows steps 3700 and 3800 of the method 1000.

In step 3700, the resist mask 270 is removed from the vertical material stack 271 above the rib part 251 of the waveguide 250. In this embodiment, ashing is performed for removing the resist mask 270.

In step 3800, oxide in form of $SiO_2$ 272 is deposited over the structure. In other embodiments, another oxide may be deposited instead of $SiO_2$.

Figure 21:
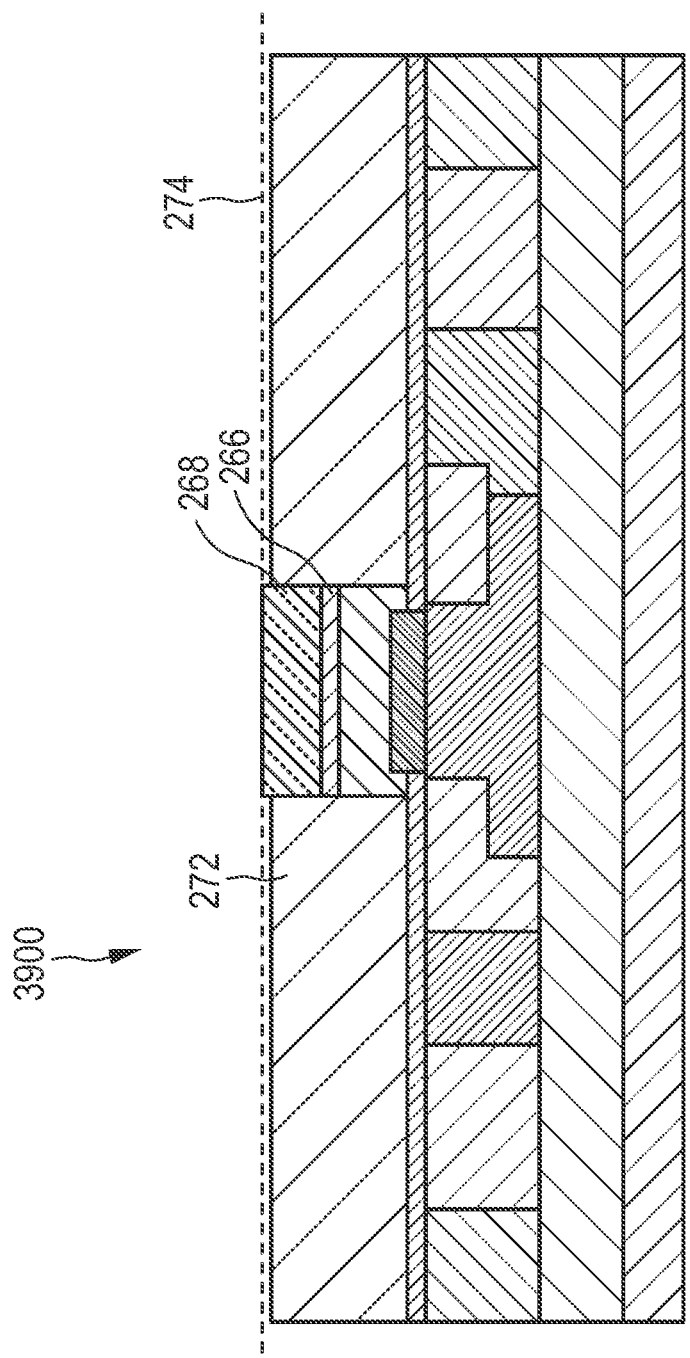

FIG. 21 shows step 3900 of the method 1000. In step 3900, the $SiO_2$ 272 is partly removed to a level 274 of or slightly below an upper end of the $Si_3N_4$ layer 268. In this embodiment, CMP selective to the $Si_3N_4$ is used for removing the $SiO_2$ 272.

Figure 22:
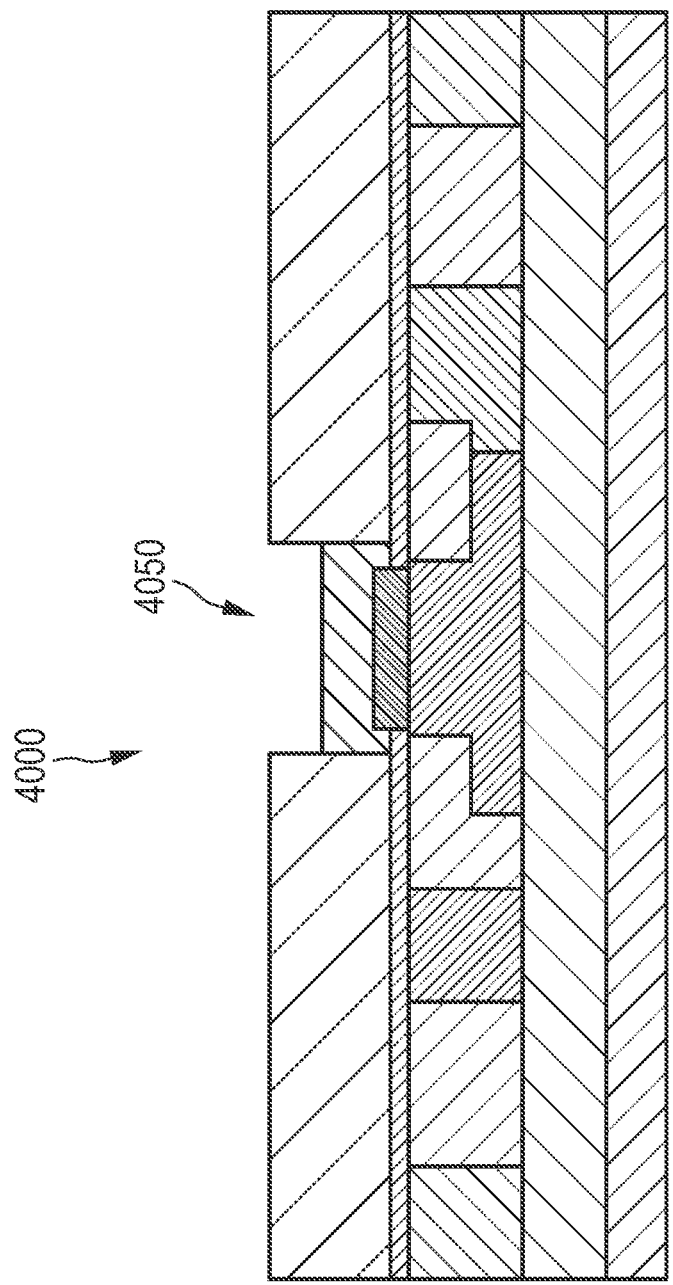

FIG. 22 shows steps 4000 and 4050 of the method 1000.

In step 4000, the $Si_3N_4$ layer 268 is removed. In this embodiment, the $Si_3N_4$ layer is removed by wet etching.

In step 4050, the remaining part of the $SiO_2$ layer 266, i.e., the part of the $SiO_2$ layer 266 above the $BaTiO_3$ layer 212, is removed by wet etching.

Figure 23:
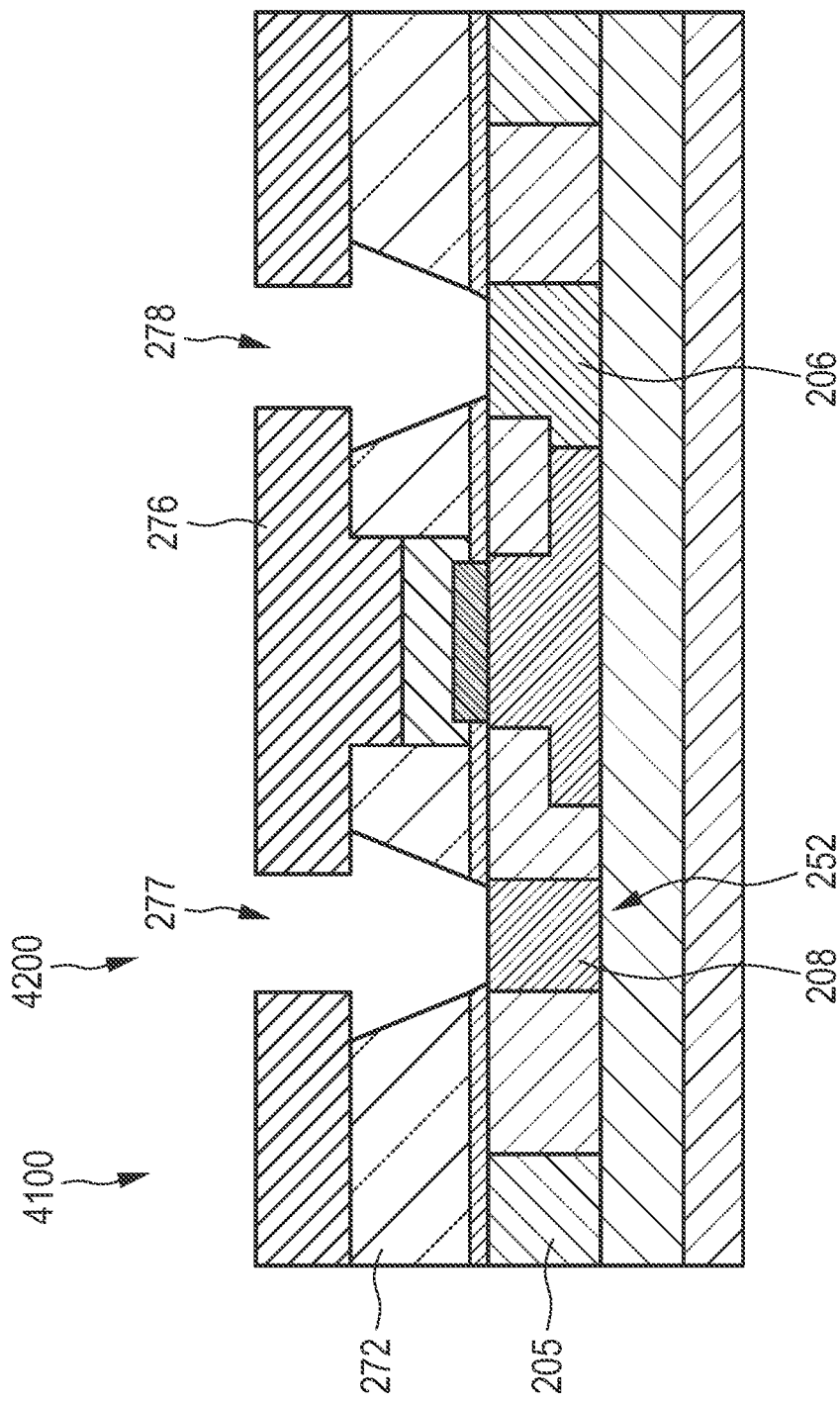

FIG. 23 shows steps 4100 and 4200 of the method 1000.

In step 4100, a resist mask 276 is arranged on the structure. The resist mask 276 includes two trenches 277 and 278 which are arranged over the first region 208 of the SOI layer 205 which forms the leveling part 252 and over the second region 206 of the SOI layer 205. In other embodiments, the trenches 277 and 278 may be provided, e.g., by RIE down to the $SiO_2$ layer 272 by endpoint (not shown).

In step 4200, etching is performed down to the SOI layer 205 in order to provide a first trench 277 to the first region 208 of the SOI layer 205 forming the leveling part 252 and a second trench 278 to the second region 206 of the SOI layer 205. In this embodiment, wet etching is used.

Figure 24:
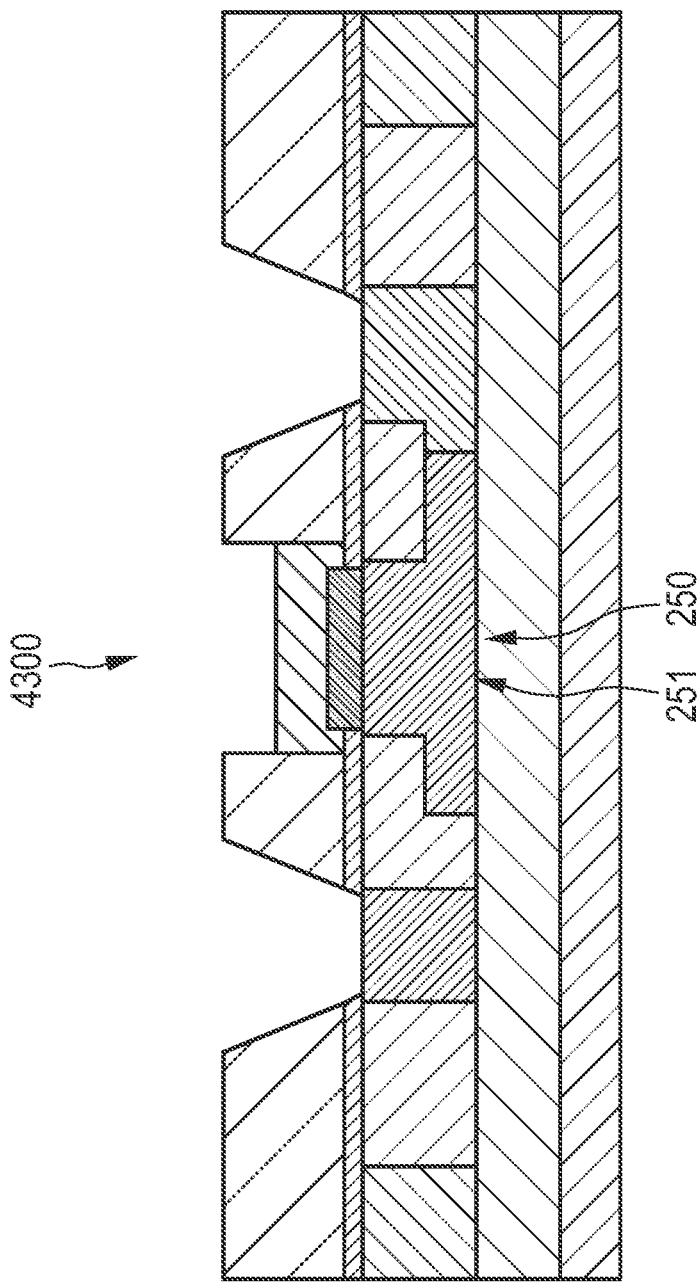

FIG. 24 shows step 4300 of the method 1000. In step 4300, the resist mask 276 is removed. In this embodiment, ashing is performed to remove the resist mask 276.

Figure 25:
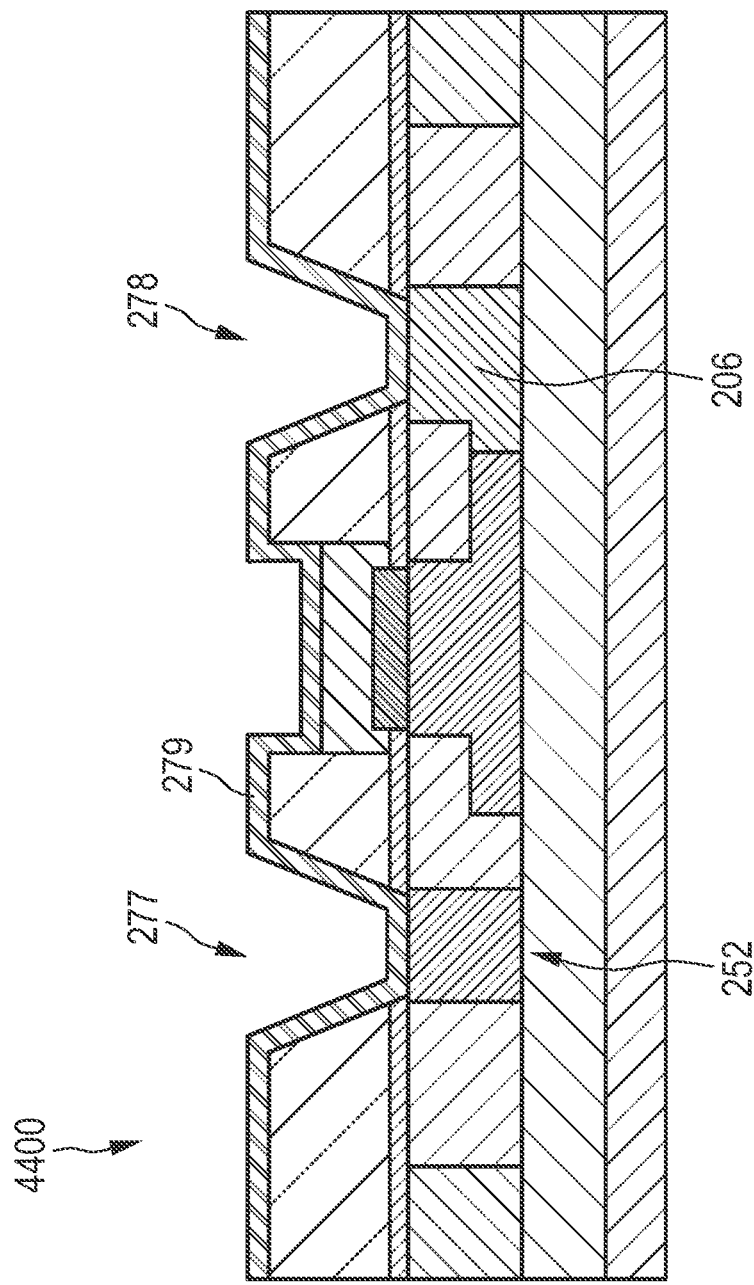

FIG. 25 shows step 4400 of the method 1000. In step 4400, a conducting top layer in form of an in-situ doped poly-Si layer 279 is deposited on the structure. In this embodiment, the conducting top layer is made of in-situ doped poly-Si. In other embodiments, the conducting top layer may be made of another conducting material, e.g., in-situ doped $Si_{1-x}Ge_x$. The method may also include a doping step instead of depositing in-situ doped conducting material. The in-situ doped poly-Si is doped with a second dopant. In particular, if the first region 208 and second region 206 of the SOI layer 205 are n-doped, the in-situ doped poly-Si layer 279 is p-doped and vice versa. The p-doped region, i.e., the region which is p-doped, may be doped with, for example, boron atoms. The n-doped region, i.e., the region which is n-doped, may be doped with, for example, phosphorus atoms or arsenic atoms. Alternatively, other dopants may be used for doping the n-doped region and/or the p-doped region.

Since the trenches 277 and 278 extend down to the leveling part 252 and the second region 206, the in-situ doped poly-Si layer 279 is arranged on a similar level with the second region 206.

Figure 26:
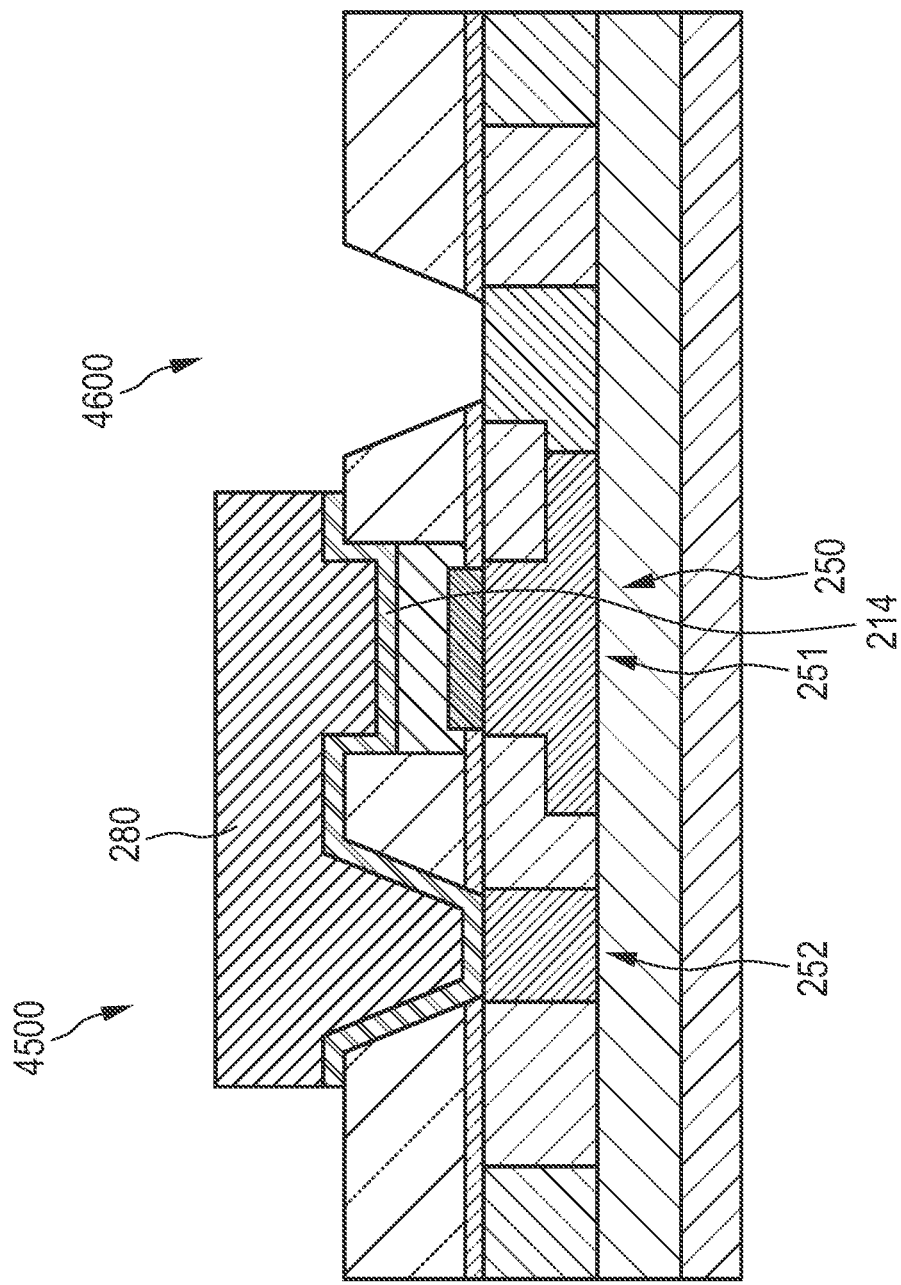

FIG. 26 shows steps 4500 and 4600 of the method 1000.

In step 4500, a resist mask 280 is arranged on the structure.

In step 4600, parts of the in-situ doped poly-Si layer 279 which are not above the leveling part 252 or the rib part 251 of the rib waveguide 250 are removed, such that in-situ doped poly-Si layer 214 is produced. In this embodiment, RIE is used for removing them. In other embodiments, any other dry etching technique may be used for removing them.

Figure 27:
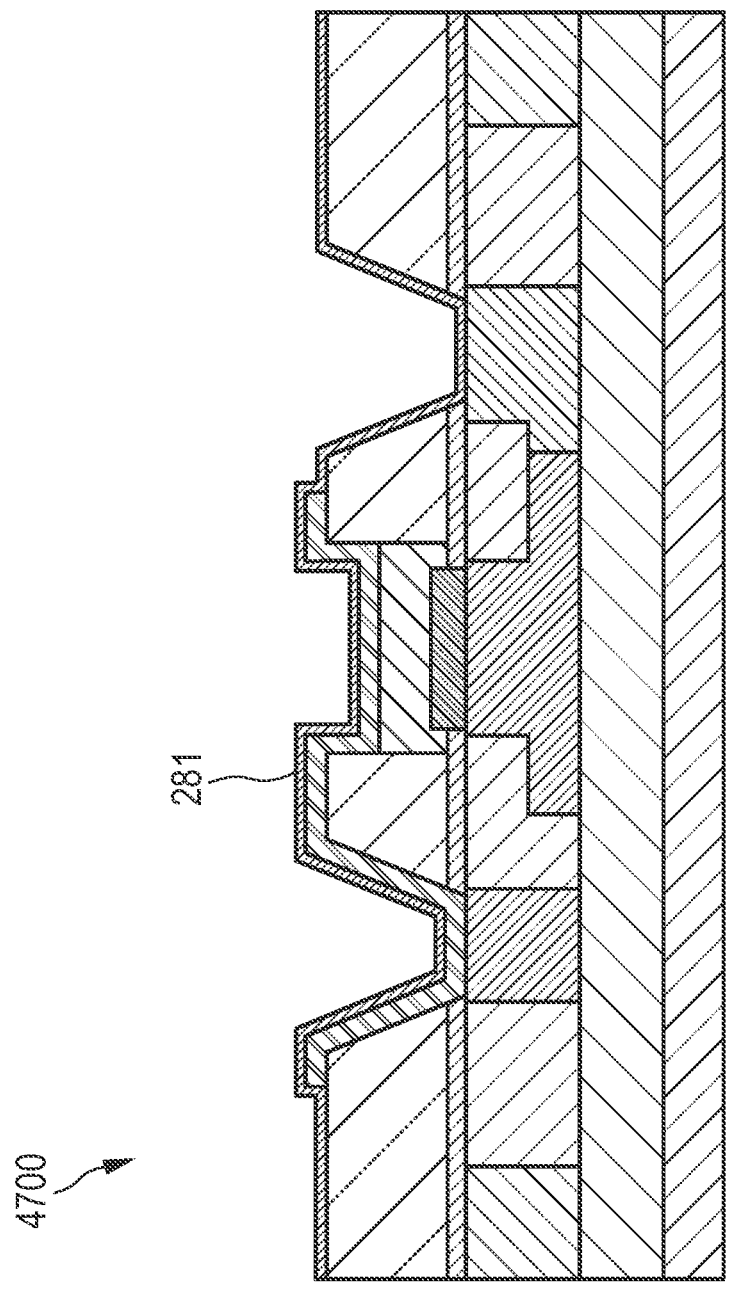

FIG. 27 shows step 4700 of the method 1000. In step 4700, oxide in form of $SiO_2$ 281 is deposited on the structure. In this embodiment, the oxide is $SiO_2$ 281. In other embodiments, any other oxide may be deposited instead.

Figure 28:
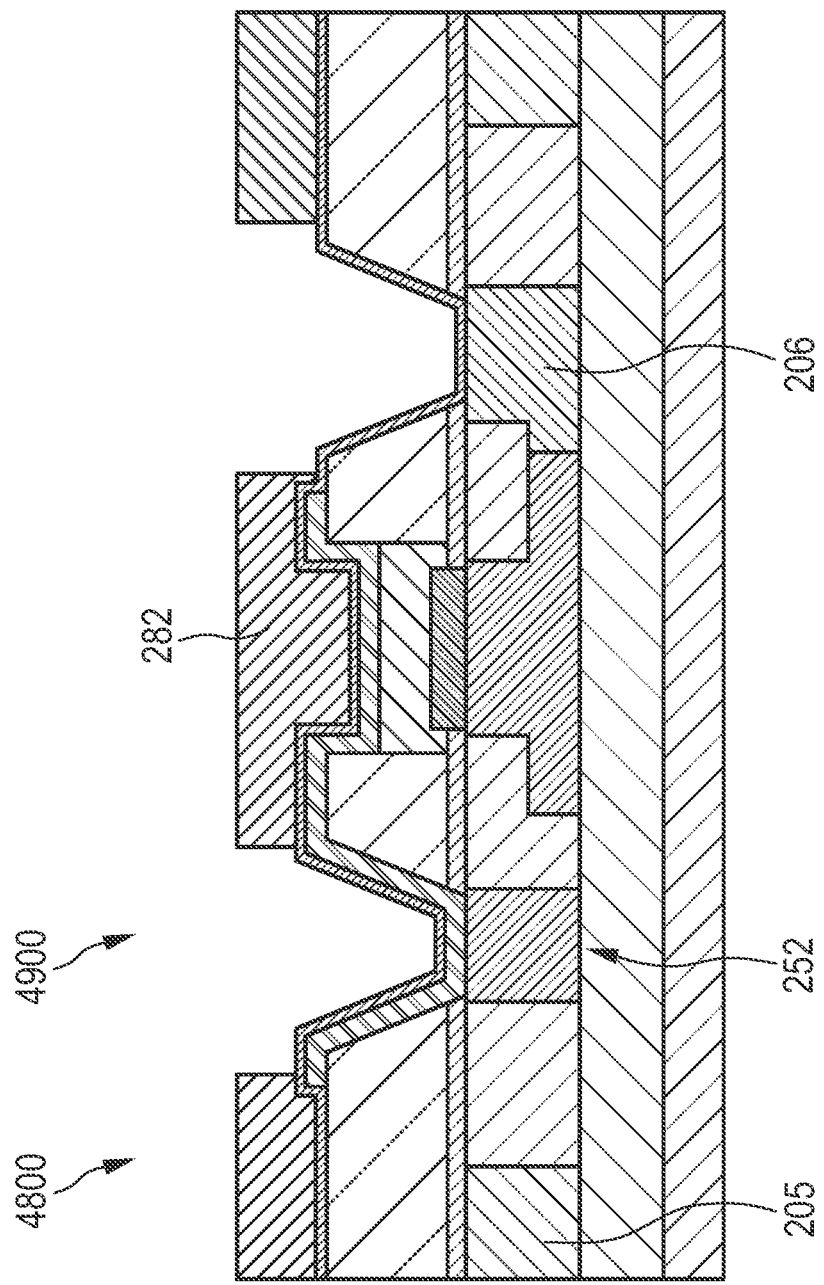

FIG. 28 shows steps 4800 and 4900 of the method 1000.

In step 4800, a resist mask 282 is arranged on the structure.

In step 4900, parts of the resist mask 282 above the leveling part 252 and the second region 206 of the SOI layer 205 are removed. In this embodiment, RIE is used for removing them. In other embodiments, any other dry etching technique may be used for removing them. In yet other embodiments, the resist mask may be provided with corresponding trenches above the leveling part 252 and the second region 206 of the SOI layer 205.

Figure 29:
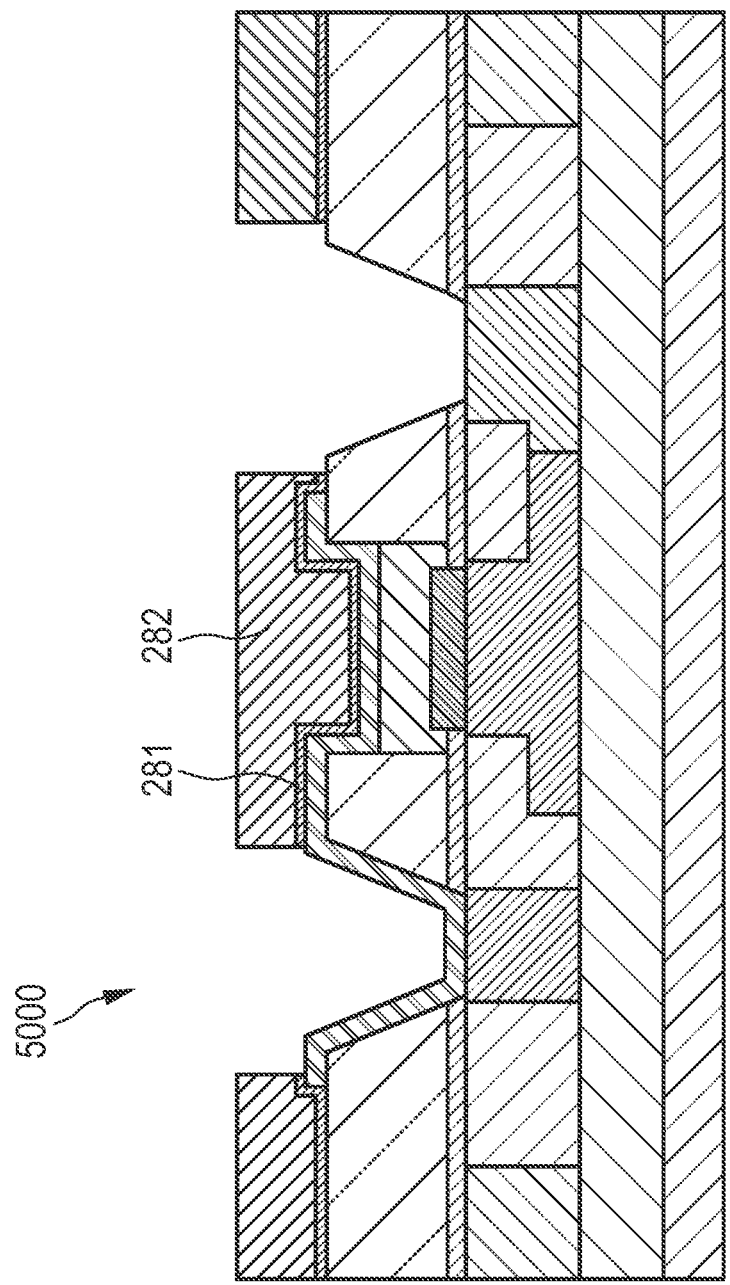

FIG. 29 shows step 5000 of the method 1000. In step 5000, the $SiO_2$ 281 is removed using the resist mask 282, i.e., the $SiO_2$ 281 is removed at regions at which it is not below the resist mask 282. In this embodiment, wet etching is performed for removing the $SiO_2$ 281. The wet etching is performed down to in-situ doped poly Si layer 214 and the second region 206 of the SOI layer 205, e.g., by endpoint.

Figure 30:
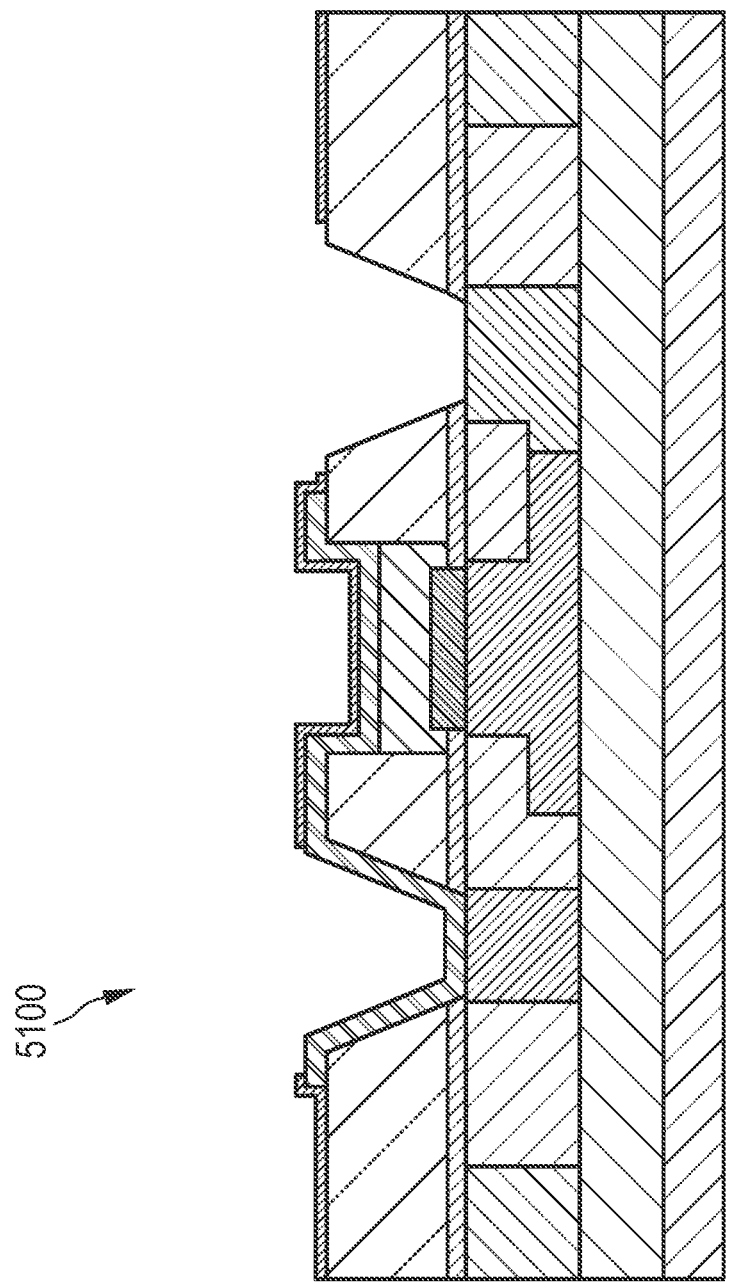

FIG. 30 shows step 5100 of the method 1000. In step 5100, the resist mask 282 is removed. In this embodiment, ashing is used for removing the resist mask 282.

Figure 31:
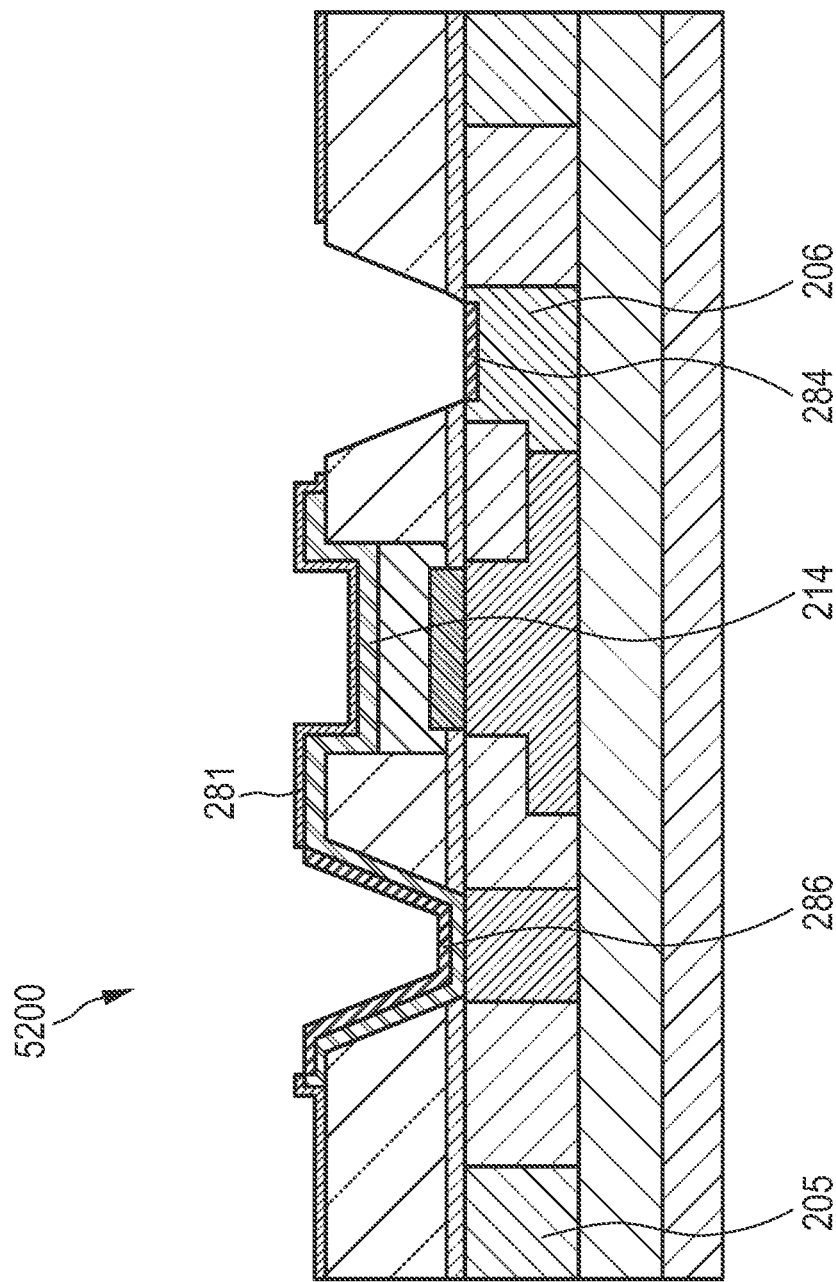

FIG. 31 shows step 5200 of the method 1000. In step 5200, regions of the in-situ doped poly-Si layer 214 which are not covered by $SiO_2$ 281 and the second region 206 of the SOI layer 205 are doped by a silicide in form of cobalt silicide (CoSi) forming contacting layers 286 and 284. In other embodiments, the silicide used for doping may be another silicide, such as nickel silicide (NiSi).

Figure 32:
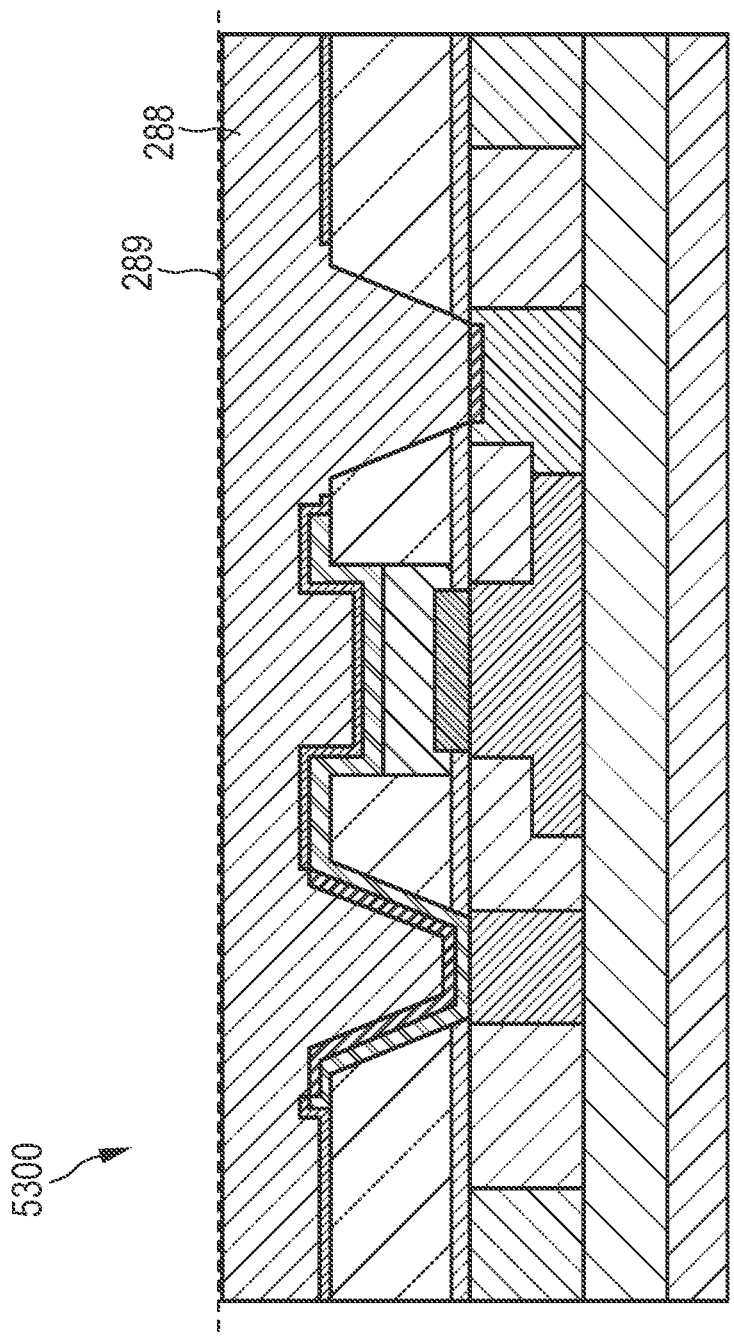

FIG. 32 shows step 5300 of the method 1000. In step 5300, an oxide layer in form of $SiO_2$ layer 288 is deposited on the structure and CMP is performed to bring the oxide layer to an even level 289. In this embodiment, the oxide layer is made of $SiO_2$. In other embodiments, the oxide layer may be made of another oxide.

Figure 33:
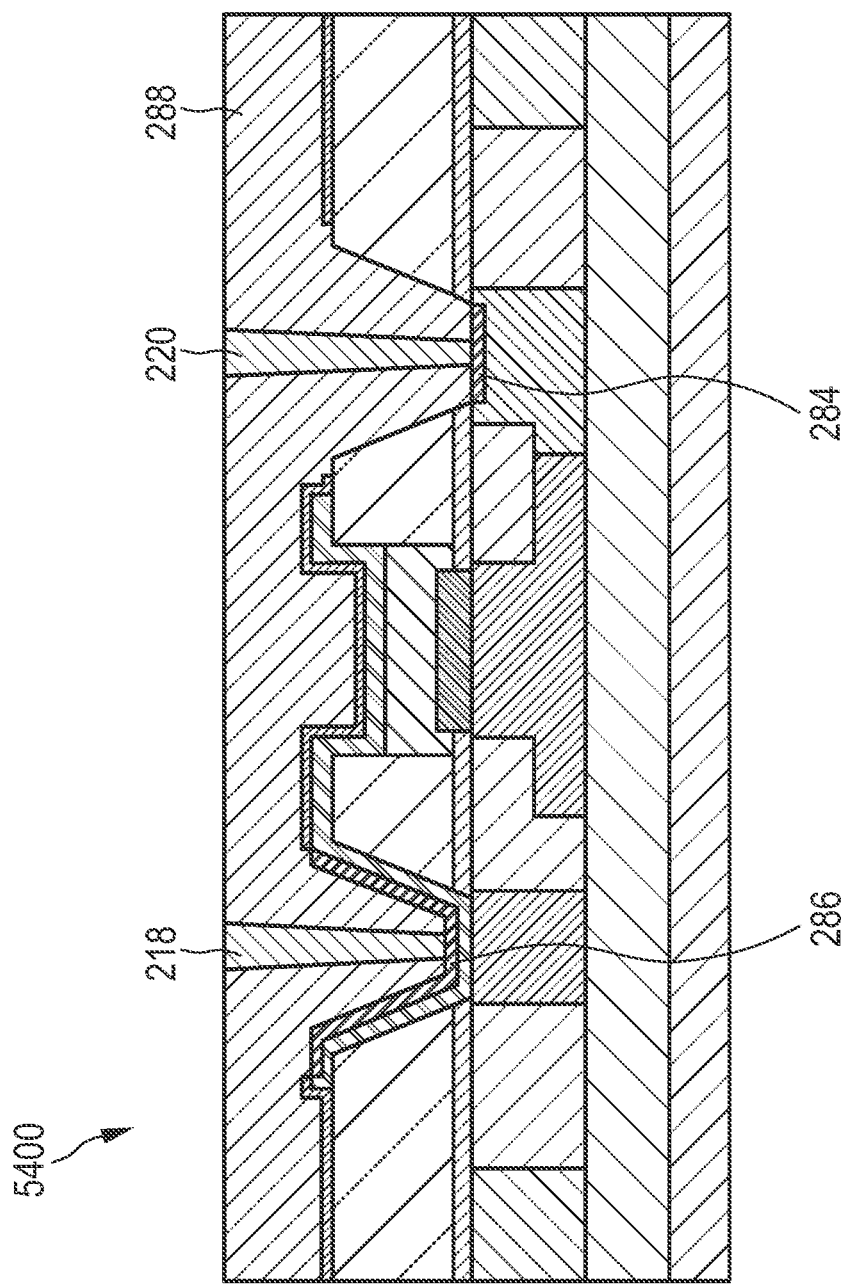

FIG. 33 shows step 5400 of the method 1000. In step 5400, a first part of a first connector in form of electronic vias 220 and a first part of a second connector in form of electronic vias 218 are implanted into the $SiO_2$ layer 288 between a top surface of the $SiO_2$ layer 288 and the contacting layers 284 and 286. In this embodiment, the electronic vias 220 and 218 are made of tungsten (W). In other embodiments, the first parts of the connectors may be made of another conducting material.

Due to the leveling part 252, the contacting layers 284 and 286 are on a similar level. This allows to contact the in-situ doped poly-Si layer 279 and the second region 206 on a similar level via the first connectors 220 to a higher lying layer.

FIG. 34 shows steps 5500 and 5600 of the method 1000.

In step 5500, a further oxide layer in form of $SiO_2$ layer 290 is deposited on the structure. In this embodiment, the oxide layer is made of $SiO_2$. In other embodiments, the oxide layer may also be made of another oxide.

In step 5600, a second part of the first connector in form of electronic vias 221 and a second part of the second connector in form of electronic vias 219 are implanted into the $SiO_2$ layer 290 extending between a surface of the $SiO_2$ layer 290 and the first parts of the electronic connectors, i.e., electronic vias 220 and 219. In this embodiment the second parts of the connectors are made of tungsten. In other embodiments, they may be made of another conducting material. Instead of providing second parts of the connectors, the first parts of the connectors may also be longer.

FIG. 35 shows step 5700 of the method 1000 which finally provides the second embodiment of the EO phase-shifter 200. In step 5700, electrodes in form of gold (Au) electrodes 222 and 224 are arranged on top of the second electronic vias 221 in an upper layer in form of metal layer 292. In this embodiment, the electrodes are metal electrodes made of Au. In other embodiments, the electrodes may also be made of another conducting material, in particular a metal.

The EO phase-shifter 200 comprises a conducting bottom layer in form of the SOI layer 205, a center layer in form of the vertical material stack 271, a conducting top layer in form of the doped poly-Si layer 214, first electrode 222, second electrode 224, first electrical connector in form of electronic vias 220 and 221, and second electrical connector in form of electronic vias 218 and 219.

The SOI layer 205 has a first refractive index of 3.98 at a wavelength of 598 nm. The doped poly-Si layer 214 has a third refractive index, which is identical to the first refractive index in this case as both are made of Si. The vertical material stack 271 includes a ferroelectric material in form of $BaTiO_3$ and a template material in form of $Si_{1-x}Ge_x$ region 210. The vertical material stack 271 has a second refractive index. The refractive index of $BaTiO_3$ is 2.43 at a wavelength of 598 nm. In this embodiment, the $Si_{1-x}Ge_x$ has x=0.89 such that its refractive index is 5.40 at a wavelength of 598 nm. The thickness of the template material, i.e., below 23 nm and the ferroelectric material, i.e., between 50 nm and 80 nm, are chosen such that the second refractive index is lower than the first refractive index and lower than the third refractive index. The SOI layer 205, the vertical material stack 271, and the doped poly-Si layer 214 thus form a slot waveguide.

The vertical material stack 271 is arranged on top of the first region 208 of the SOI layer 205, in particular, above the rib of the rib waveguide 250. The vertical material stack 271 is thus not arranged on top of the second region 206 of the SOI layer 205. The doped poly-Si layer 214 is arranged on top of the vertical material stack 271.

The first electrode 222 and the second electrode 224 are arranged in an upper layer in form of the metal layer 292, such that the metal layer 292 is arranged above the SOI layer 205 and above the doped poly-Si layer 214. The first electronic vias 220 and 221 connect the second region 206 of the SOI layer 205 with the first electrode 222 and the second electronic vias 218 and 219 connect the doped poly-Si layer 214 with the second electrode 224.

The EO phase shifter 200 may be connected to a power source, in particular, the electrodes 222 and 224 may be connected to a power source. The power source may also be included in the EO phase shifter (not shown). A CMOS compatible driver voltage, e.g., 2 V, may be applied to the electrodes 222 and 224 for generating a vertical electric field between the doped poly-Si layer 214 and the first region 208 of the SOI layer 205 through the vertical material stack 271 in order to induce the LEOE in the $BaTiO_3$ layer 212 such that EO modulation may be performed.

In other embodiments, the EO phase-shifter may be used as an EO modulator configured for intensity modulation, e.g., by implementing the EO phase-shifter, for example, in an interferometer, e.g., a Mach-Zehnder-interferometer, or a resonator, e.g., a Fabry-Perot-resonator or a ring resonator to form an EO modulator.

In other embodiments, at least one of the conducting top layer and the conducting bottom layer may be doped, such that it includes a third region arranged on top or respectively below the center layer. The third region may be doped such that it has a higher doping concentration than another region surrounding the third region, e.g., the first region. The third doping concentration may be, for example, between $10^{18}$ and $10^{20}$ atoms per cubic centimeter in the conducting top layer and/or in the conducting bottom layer. The third region may, for example, have the same doping concentration as the second region.

The configurations of the EO phase shifters 100 and 200 presented in FIGS. 1 and 35 allow an integration in the FEOL of an EPIC.

Figure 36:
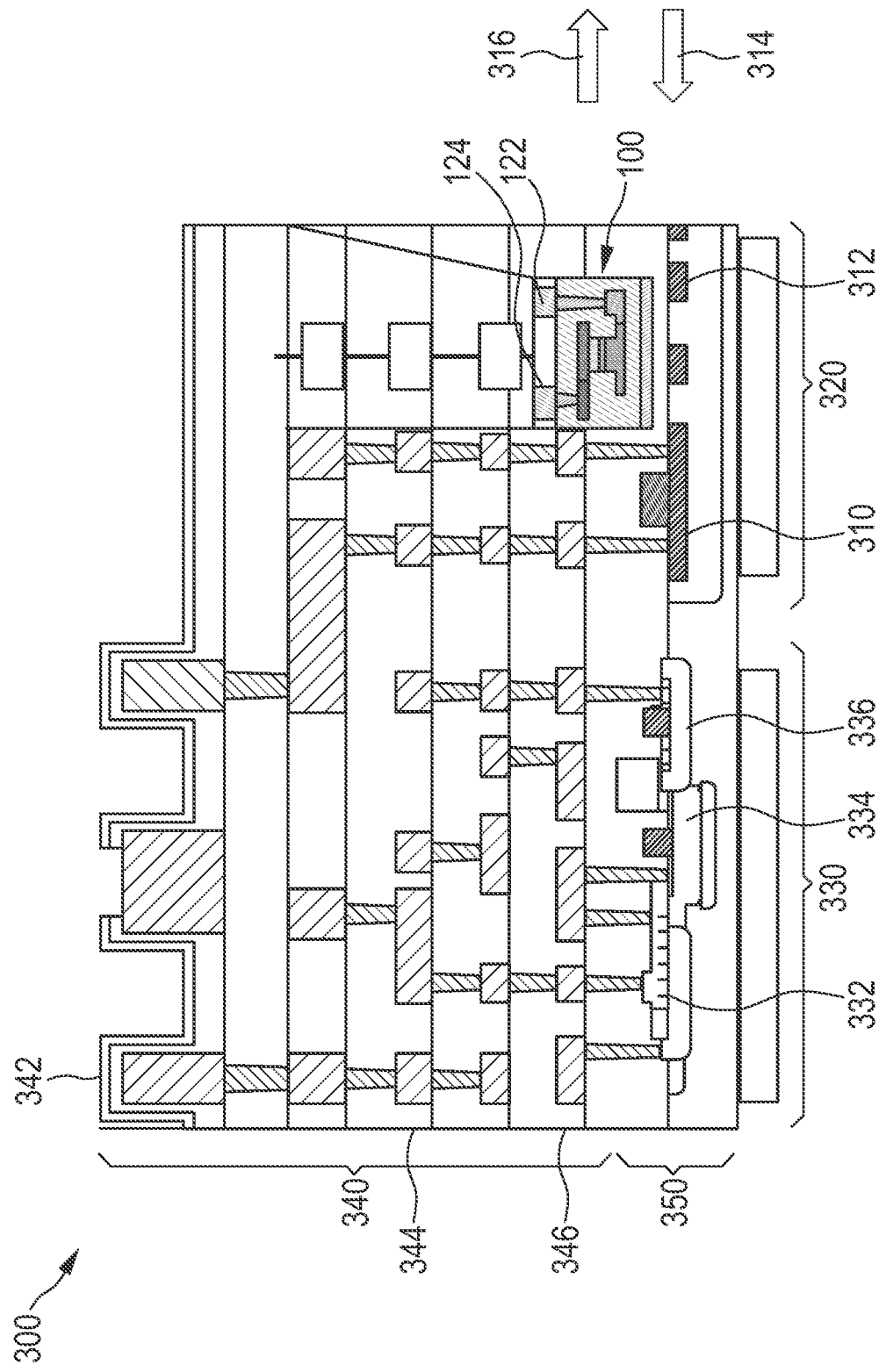
FIG. 36 shows an embodiment of an EPIC including the first embodiment of the EO phase shifter in its FEOL.

FIG. 36 shows a cross sectional view of an embodiment of an EPIC 300 comprising the embodiment of the phase-shifter 100. In this embodiment, the phase shifter 100 is integrated in the FEOL. Identical features are referred to using identical reference numerals for FIGS. 1 and 36. In other embodiments, the phase-shifter 200 of FIG. 35 may be integrated into the EPIC 300.

The EPIC 300 has a FEOL 350 and a BEOL 340. The FEOL 350 is fabricated with a FEOL technology. The FEOL 350 comprises a Si photonic integrated circuit (PIC) region 320 and an electronic integrated circuit (EIC) region 330. The Si PIC region 320 comprises a Ge photodiode 310, Si waveguides 312 and the EO phase shifter 100. Impinging light signals 314 may be received and transmitted light signals 316 may be transmitted from the EPIC 300. The EIC region 330 comprises a SiGe heterojunction bipolar transistor (SiGe:C HBT) 332, an n-channel metal-oxide-semiconductor (NMOS) 334 and a p-channel metal-oxide-semiconductor (PMOS) 336 which form a Bi-CMOS. The BEOL 340 comprises an interconnect stack 342 with several metal planes 344 and 346.

An integration of the EO phase shifter 100 of FIG. 1 into the EPIC 300 allows an integration in the FEOL 350. This allows reducing losses for optical coupling the FEOL with the EO phase-shifter as the EO-phase shifter is integrated in the FEOL 350 and not in the BEOL 340 as for the prior art. Furthermore, the EO phase shifter 100 may be connected to any of the metal planes, e.g., metal planes 344 and 346, above the FEOL in the BEOL.

Figure 37C:
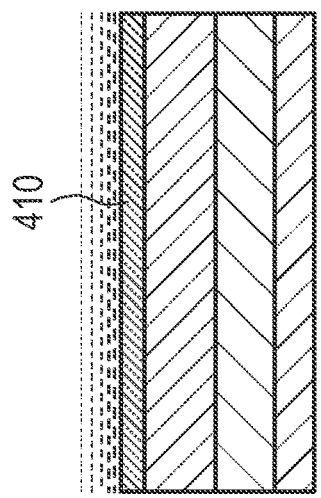
FIG. 37C shows a third alternative process for growing a $Si_{1-x}Ge_x$ layer on a carrier layer.
Figure 37B:
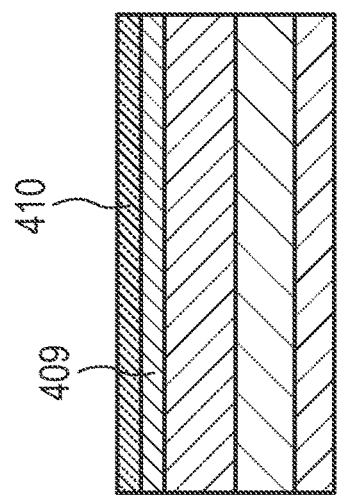
FIG. 37B shows a second alternative process for growing a $Si_{1-x}Ge_x$ layer on a carrier layer.
Figure 37A:
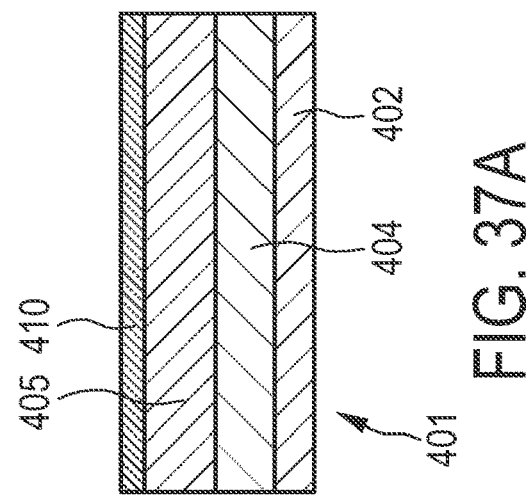
FIG. 37A shows a first alternative process for growing a $Si_{1-x}Ge_x$ layer on a carrier layer.

FIG. 37A shows a cycling annealing approach for providing a $Si_{1-x}Ge_x$ layer 410 with a thickness smaller than 23 nm on a carrier layer 401. In this embodiment, the carrier layer 401 includes a Si substrate 402, a BOX layer 404, and a SOI layer 405. In other embodiments, another template material than $Si_{1-x}Ge_x$ may be used, e.g., $SrTiO_3$.

FIG. 37B shows a reverse grating buffer approach for providing a $Si_{1-x}Ge_x$ layer 410 with a thickness smaller than 23 nm on a Ge layer 409 arranged on the carrier layer 401 shown in FIG. 37A. In other embodiments, another template material than $Si_{1-x}Ge_x$ may be used, e.g., $SrTiO_3$.

FIG. 37C shows a cycling annealing approach for providing a $Si_{1-x}Ge_x$ layer 410 with thickness larger than 50 nm followed by back etching the $Si_{1-x}Ge_x$ layer 410 to a thickness smaller than 23 nm. In other embodiments, another template material than $Si_{1-x}Ge_x$ may be used, e.g., $SrTiO_3$.

FIG. 38 shows a detail of a third embodiment of an EO phase shifter 500. The detail essentially includes the layers that form a slot waveguide. Only a layer stack is shown without the structure around the layer stack.

The EO phase shifter 500 comprises a carrier layer 501 including an Si substrate 502, a BOX layer 504, and a SOI layer 505 arranged on the BOX layer 504. The SOI layer 505 is made of c-Si. In this embodiment, the SOI layer 505 includes a first region 508 which is doped with a first doping concentration between $10^{13}$ and $10^{18}$ atoms per cubic centimeter. The SOI layer 505 serves as a conducting bottom layer.

A vertical material stack 571 forms a center layer of the slot waveguide. The vertical material stack 571 includes a buffer layer 510 made of $Si_{1-x}Ge_x$. Additionally, the center layer includes a ferroelectric material. In this embodiment, the ferroelectric material is $BaTiO_3$ forming a ferroelectric material layer in form of $BaTiO_3$ layer 512.

A conducting top layer in form of a doped a-Si layer 579 is arranged on top of the $BaTiO_3$ layer 512, such that the vertical material stack 571 is sandwiched between the doped a-Si layer 579 and the SOI layer 505 forming a slot waveguide. The conducting top layer is a doped top layer which includes a first region 514 which is doped with a first doping concentration between $10^{13}$ and $10^{18}$ atoms per cubic centimeter.

An insulating layer 588 is arranged on top of the doped a-Si layer 579. Electrodes are connected to the conducting top layer and the conducting bottom layer in non-shown parts of the EO phase shifter 500.

A driver voltage, e.g., CMOS-compatible driver voltage, may be applied via the electrodes to the SOI layer 505 and the doped a-Si layer 579, such that a vertical electrical field Ev may be provided between them that allows EO modulation in the ferroelectric material, i.e., in the $BaTiO_3$ layer 512.

FIG. 39 shows a detail of a fourth embodiment of an EO phase shifter 600. The fourth embodiment of the EO phase shifter 600 is similar to the third embodiment of the EO phase shifter 500. Reference signs 5xx and 6xx regard same layers or regions, respectively.

In contrast to the EO phase shifter 500, the EO phase shifter 600 additionally includes third regions 611 with a third doping concentration between $10^{18}$ and $10^{20}$ atoms per cubic centimeter in the conducting bottom layer in form of the SOI layer 605 arranged in between first regions 608 with a first doping concentration between $10^{13}$ and $10^{18}$ atoms per cubic centimeter. The first regions 608 and the third regions 611 are doped with dopants of a same type, i.e., such that they become p-doped or n-doped regions. In this embodiment, the third regions 611 and the first regions 608 are n-doped regions. Furthermore, the EO phase shifter 600 includes third regions 615 with a third doping concentration between $10^{18}$ and $10^{20}$ atoms per cubic centimeter in the conducting top layer in form of the doped a-Si layer 679 arranged in between first regions 614 with a first doping concentration between $10^{13}$ and $10^{18}$ atoms per cubic centimeter. The first regions 614 and the third regions 615 are doped with dopants of a same type. In this embodiment, the third regions 615 and the first regions 614 are p-doped regions.

In other embodiments, the third regions and first regions may also have other doping concentrations, e.g., each of the third regions, i.e., between the conducting top layer and the conducting bottom layer as well as between different third regions in the same layer, may have a different doping concentration. Also only one of the conducting top layer and the conducting bottom layer may include one or more third regions. The third regions may, for example, have the same doping concentration as the second regions (not shown).

As for the third embodiment of the EO phase shifter 500, a driver voltage, e.g., CMOS-compatible driver voltage, may be applied via the electrodes to the SOI layer 605 and the doped a-Si layer 679, such that a vertical electrical field Ev may be provided between them that allows EO modulation in the ferroelectric material, i.e., in the $BaTiO_3$ layer 612.

In summary, the present invention relates to producing an electro-optical phase shifter such that it may be integrated into a front-end of line of an electronic-photonic integrated circuit. A conducting bottom layer with a first refractive index is provided. A center layer including a ferroelectric material and with a second refractive index is provided on top of a first region of the conducting bottom layer, such that the center layer is not on top of a second region of the conducting bottom layer. A conducting top layer with a third refractive index is provided on top of the center layer. The second refractive index is lower than the first refractive index and lower than the third refractive index, such that the conducting bottom layer, the center layer, and the conducting top layer form a slot waveguide. A first electrical connector which connects the second region of the conducting bottom layer with an upper layer is provided. Additionally, a second electrical connector which connects the conducting top layer with the upper layer is provided. A first electrode and a second electrode are provided in the upper layer such that the first electrode connects to the second region of the conducting bottom layer via the first electrical connector and the second electrode connects to the conducting top layer via the second electrical connector. This method allows integrating the EO phase-shifter in the front-end of line of an electronic-photonic integrated circuit.

What is claimed is:

1. A method for producing an electro-optical phase shifter, comprising the steps:
    providing a conducting bottom layer with a first refractive index,
    providing a center layer including a ferroelectric material and with a second refractive index on top of a first region of the conducting bottom layer, such that the center layer is not on top of a second region of the conducting bottom layer, and
    providing a conducting top layer with a third refractive index on top of the center layer,
    wherein the second refractive index is lower than the first refractive index and lower than the third refractive index, such that the conducting bottom layer, the center layer, and the conducting top layer form a slot waveguide, such that field confinement is achieved between the conducting bottom layer and the conducting top layer, and
    providing a first electrical connector which connects the second region of the conducting bottom layer with an upper layer and a second electrical connector which connects the conducting top layer with the upper layer, and
    providing a first electrode and a second electrode in the upper layer such that the first electrode connects to the second region of the conducting bottom layer via the first electrical connector and the second electrode connects to the conducting top layer via the second electrical connector.

2. The method according to claim 1, wherein the first electrode and the second electrode are provided in the upper layer such that they are arranged laterally to each other.

3. The method according to claim 2, wherein the center layer is provided such that it includes a template material arranged between the conducting bottom layer and the ferroelectric material, and wherein the template material is selected such that a lattice mismatch between the conducting bottom layer and the ferroelectric material is mitigated.

4. The method according to claim 3, wherein the template material is arranged between the conducting bottom layer and the ferroelectric material by:
    a cycling annealing approach with a template material thickness smaller than 23 nm, or
    a reverse grating buffer approach with a template material thickness smaller than 23 nm, or
    a cycling annealing approach with a template material thickness larger than 50 nm followed by back etching the template material to a thickness smaller than 23 nm.

5. The method according to claim 1, wherein the conducting top layer, the conducting bottom layer, or both are doped or provided as in-situ doped layers.

6. The method according to claim 5, wherein at least one of the conducting top layer and the conducting bottom layer is doped, such that it includes a third region arranged on top or respectively below the center layer, and wherein the third region is doped such that it has a higher doping concentration than another region surrounding the third region.

7. The method according to claim 1, wherein the conducting top layer is provided such that it includes a first region which is arranged on top of the center layer and a second region which is not arranged on top of the center layer.

8. The method according to claim 7,
    wherein the conducting top layer is doped such that the first region of the conducting top layer has a first doping concentration, the second region of the conducting top layer has a second doping concentration, and the second doping concentration is higher than the first doping concentration,
    wherein the conducting bottom layer is doped such that the first region of the conducting bottom layer has a first doping concentration, the second region of the conducting bottom layer has a second doping concentration, and the second doping concentration is higher than the first doping concentration,
    wherein the conducting top layer and the conducting bottom layer are doped such that the first regions of the conducting top layer and the conducting bottom layer have first doping concentrations, the second regions of the conducting top layer and the conducting bottom layer have second doping concentrations, and the second doping concentrations are higher than the first doping concentrations.

9. The method according to claim 1, wherein the conducting bottom layer is structured into a rib waveguide.

10. The method according to claim 1, wherein the conducting bottom layer is provided such that it includes a silicon-on-insulator layer.

11. The method according to claim 1, wherein the ferroelectric material is provided such that it includes barium titanate.

12. The method according to claim 1, wherein at least a region of the conducting top layer which is connected to the second electrode via the second electrical connector is at a same vertical level as the second region of the conducting bottom layer.

13. The method according to claim 1, wherein the center layer is provided such that it includes a template material arranged between the conducting bottom layer and the ferroelectric material, and wherein the template material is selected such that a lattice mismatch between the conducting bottom layer and the ferroelectric material is mitigated.

14. The method according to claim 13, wherein the template material is arranged between the conducting bottom layer and the ferroelectric material by:
   a cycling annealing approach with a template material thickness smaller than 23 nm, or
   a reverse grating buffer approach with a template material thickness smaller than 23 nm, or
   a cycling annealing approach with a template material thickness larger than 50 nm followed by back etching the template material to a thickness smaller than 23 nm.

15. An electro-optical phase shifter comprising:
   a conducting bottom layer with a first refractive index,
   a center layer including a ferroelectric material and with a second refractive index which is arranged on top of a first region of the conducting bottom layer and which is not arranged on top of a second region of the conducting bottom layer,
   a conducting top layer with a third refractive index which is arranged on top of the center layer,
   a first electrode and a second electrode arranged in an upper layer, and
   a first electrical connector which connects the second region of the conducting bottom layer with the first electrode and a second electrical connector which connects the conducting top layer with the second electrode,
   wherein the second refractive index is lower than the first refractive index and lower than the third refractive index, and
   wherein the conducting bottom layer, the center layer, and the conducting top layer form a slot waveguide, such that field confinement is achievable between the conducting bottom layer and the conducting top layer.

16. An electronic-photonic integrated circuit comprising the electro-optical phase shifter according to claim 15.

17. An electronic-photonic integrated circuit according to claim 16, wherein the electro-optical phase shifter is integrated in a front end of line of the electronic-photonic integrated circuit.

* * * * *